United States Patent
Hill et al.

(10) Patent No.: US 8,396,793 B2
(45) Date of Patent: Mar. 12, 2013

(54) PAYMENT CARD BASED REMITTANCE METHODS AND SYSTEM

(75) Inventors: Dennis J. Hill, St. Paul, MO (US);
Sandeep Malhotra, Ballwin, MO (US);
Sara E. Fiebiger, Ellisville, MO (US);
Dana Lorberg, St. Louis, MO (US);
Patrick Killian, Cottleville, MO (US)

(73) Assignee: MasterCard International Incorporated, Purchase, NY (US)

( * ) Notice: Subject to any disclaimer, the term of this patent is extended or adjusted under 35 U.S.C. 154(b) by 915 days.

(21) Appl. No.: 11/836,956

(22) Filed: Aug. 10, 2007

(65) Prior Publication Data

US 2008/0249929 A1    Oct. 9, 2008

Related U.S. Application Data

(60) Provisional application No. 60/910,495, filed on Apr. 6, 2007, provisional application No. 60/910,543, filed on Apr. 6, 2007.

(51) Int. Cl.
*G06Q 40/00* (2012.01)
(52) U.S. Cl. .............. 705/39; 705/30; 705/35
(58) Field of Classification Search .......... 705/30, 705/35, 39
See application file for complete search history.

(56) References Cited

U.S. PATENT DOCUMENTS

| | | | |
|---|---|---|---|
| 5,721,768 A | 2/1998 | Stimson et al. | |
| 5,963,647 A | 10/1999 | Downing et al. | |
| 6,185,545 B1 | 2/2001 | Resnick et al. | |
| 6,868,391 B1 | 3/2005 | Hultgren | |
| 6,948,070 B1* | 9/2005 | Ginter et al. | 713/193 |
| 7,258,274 B2 | 8/2007 | Levinas et al. | |
| 2001/0032183 A1* | 10/2001 | Landry | 705/40 |
| 2002/0026396 A1* | 2/2002 | Dent et al. | 705/35 |
| 2002/0188845 A1* | 12/2002 | Henderson et al. | 713/168 |
| 2003/0061170 A1* | 3/2003 | Uzo | 705/64 |
| 2003/0233317 A1* | 12/2003 | Judd | 705/39 |
| 2004/0078321 A1 | 4/2004 | Lawrence | |
| 2006/0287953 A1 | 12/2006 | Chauhan | |

FOREIGN PATENT DOCUMENTS

WO    2006084707 A1    8/2006

OTHER PUBLICATIONS

"Waving the Wand", Wizzit, Financial Mail, Nov. 25, 2005, Technology & Communications, pp. 38-39.
"Talking 'bout a revolution" Wizzit—banking, Maverick Magazine, Nov. 2005, 5pgs.
"Celephone Banking Reinvented", Wizzit, SA Computer Magazine, Oct. 2005, 3pgs.
"South African m-banking market heats up", Wait, Southern African Wireless Communications, Nov. 2005, 1pg.
"How P.A.T. Works", Copyright 2005-2007 CPNI Inc. 3pgs.
"What Works: Smart Communications'BOP-Driven Business Model", World Resources Institution Digital Dividend. Retrieved Apr. 25, 2007, Download from URL: <http://www.digitaldividend.org/case/case_smart.htm>, 3pgs.
"Standard Bank and MTN launch mobile banking JV", Finextra. Retrieved Apr. 25, 2007. Download from URL: <http://www.finextra.com/fullstory.asp?id=14095>, 2pgs.

(Continued)

*Primary Examiner* — Thomas Dixon
*Assistant Examiner* — Gerald Vizvary
(74) *Attorney, Agent, or Firm* — Buckley, Maschoff & Talwalker LLC

(57) ABSTRACT

A payment system receives, from a first financial institution, a request for a funds transfer. The request originates from a sender who has an account with the first financial institution. The payment system routes the funds transfer to a second financial institution for the benefit of a recipient. The payment system receives, from the second financial institution, the recipient's name and residential address.

32 Claims, 21 Drawing Sheets

OTHER PUBLICATIONS

Sujit Charavorli et al., "Can existing payment networks meet future needs? A conference summary", Chicago Fed Letter, Oct. 2003, No. 194, ABI/INFORM Global, 4pgs.

Annoymous, "Guidance on the Transmittal of Funds: The "Travel" Regulations", ABA Bank Compliance, May/Jun. 1997; vol. 18, No. 5, ABI/FORM Global, pp. 39-41 (3 pages total).

John Ginovsky, "21st Century Fraud", ABA Bankers News, Mar. 29, 2005, vol. 13, Iss. 7, [Retrieved on Oct. 29, 2009], Retrieved from Internet: URL: http://proquest.umi.com/pqdweb?index=49& sid=31& srchmode=1&vinst=PROD&fmt=4 . . . , 3pgs.

"Firms Ask Treasury to Simplify Money Transfer Proposals", Compliance Reporter, New York, Aug. 29, 2005, [Retrieved on Oct. 29, 2009], Retrieved from Internet: URL: http://proquest.umi.com/pqdweb?index=0&sid=29&srchmode=2&vinst=PROD&fmt= 3& . . . , 2pgs.

"Federal Reserve Orders: Amendment to the Bank Secrecy Act Regulations Relating to Recordkeeping for Funds Transfers and Transmittals of Funds by Financial Institutions", Department of the Treasury; Board of Governors of the Federal Reserve System, Final rule, Dec. 22, 1994, pp. 1-29 (29 total pages).

"Hungarian Intellectual Property Office: Examination Report", dated Feb. 2, 2012 for Singapore Patent No. 189554, 7pgs.

\* cited by examiner

| CUSTOMER NAME | RESIDENTIAL ADDRESS | ACCOUNT NUMBER | CELL NO. | I.D. DOCUMENTS |
|---|---|---|---|---|
| JOHN SMITH | 525 MAIN STREET NEW CANAAN, CT 06840 | 5555-6666-7777-8888 | 203-555-7777 | [IMAGE OF I.D. DOCS(S)] |
| CARRIE LANE | 1214 TIMBER AVENUE CHARLES CITY, IA 50616 | 5555-6666-8888-9999 | 641-666-8888 | [IMAGE OF I.D. DOCS(S)] |
| EVELYN MASTERS | 361 MAPLE STREET PURCHASE, NY 10577 | 5555-6666-9999-0000 | 914-777-9999 | [IMAGE OF I.D. DOCS(S)] |

FIG. 6

PAYMENT CARD BASED REMITTANCE METHODS AND SYSTEM

CROSS-REFERENCE TO RELATED APPLICATION

This application claims the benefit of provisional patent applications having Ser. Nos. 60/910,495 and 60/910,543, both filed Apr. 6, 2007, which applications are incorporated herein by reference.

BACKGROUND

Embodiments disclosed herein relate to remittance systems. In particular, some embodiments relate to methods, apparatus, systems, means and computer program products for implementing a remittance system on the basis of an international payment card system.

Many individuals regularly send money to family or friends across international borders. The total annual volume of international person-to-person remittances is measured in the hundreds of billions of U.S. dollars (including transactions that involve U.S. dollars and transactions that do not involve U.S. dollars) and is increasing from year to year.

Formal commercial remittance channels are generally labor-intensive and expensive to use. Many people who send or receive remittances may lack ongoing relationships with banks or other financial institutions and therefore face additional transaction costs in connection with remittances. Informal channels for remittances are also labor-intensive and may not provide adequate protection for the funds remitted. Many of the people who make or receive international remittances are not wealthy and can ill-afford the costs and risks presented by conventional remittance channels.

More generally, senders and recipients of remittances frequently find conventional remittance channels to be time-consuming and inconvenient. It is not unusual for the sender to be required to bring cash to a store operated by a remittance services provider (RSP). Accordingly, the sender is constrained to accommodate himself or herself to the store's operating hours, must carry cash on his or her person, and may have to wait in line or otherwise experience poor service at the RSP's store. The recipient also may be required to pick up the remitted funds at an RSP's store, thereby possibly suffering the same disadvantages and inconveniences that the sender was subject to.

International remittances also raise issues related to governmental security and anti-crime interests. In many countries, regulations are in place with respect to international transfers of funds, to aid in efforts to combat funding of terrorist groups and organized crime. There are also international initiatives in these areas. These types of regulations are generally referred to as "anti-money laundering" (AML) provisions, and typically require that financial institutions and RSPs "know your customer" (KYC). Compliance with KYC and AML regulations may place significant cost and administrative burdens on formal international remittance channels. Of course, these costs are passed on to the users of the remittance channels.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 6 is an illustration in tabular form of an example customer database that may be maintained in the computer system of FIG. 5.

DETAILED DESCRIPTION

In general, and for the purpose of introducing concepts of embodiments of the present invention, an international remittance system is based on a payment card account system such as that operated by MasterCard International Inc., the assignee hereof. Remittances are transferred and cleared from senders' payment card accounts to recipients' payment card accounts. Financial institutions are the issuers of the payment card accounts and handle compliance with KYC/AML regulations. The payment system that handles the funds transfer may also handle exchange of KYC/AML information between the issuers of the payment card accounts.

In some embodiments, the remittance system may allow senders to access the system and initiate funds transfers by use of the senders' mobile telephones. Further convenience may be provided by allowing the senders to identify the recipients of the funds transfers by the recipients' mobile telephone numbers. The remittance system may include capabilities for translating the recipients' mobile telephone numbers into the recipients' payment card account numbers, for the purpose of routing the funds transfers through the payment system.

In some embodiments, the institutional architecture that underlies the remittance system may include mobile network operators (MNOs) cooperating with financial institutions/payment card account issuers in many countries, with an international payment system to interlink the financial institutions. The payment system may be an existing system, like MasterCard's for example.

In still other embodiments, the payment system may include convenient features that allow senders to receive advance estimates of the effects of currency conversions on proposed funds transfers or other transactions. Other convenient features may aid recipients of funds transfers in finding nearby locations to access the transferred funds.

Remittance systems such as those described herein may leverage existing payment systems to provide previously unavailable efficiencies, cost-effectiveness and convenience, while also facilitating regulatory compliance by participating financial institutions (FIs) and RSPs.

Figure 1:
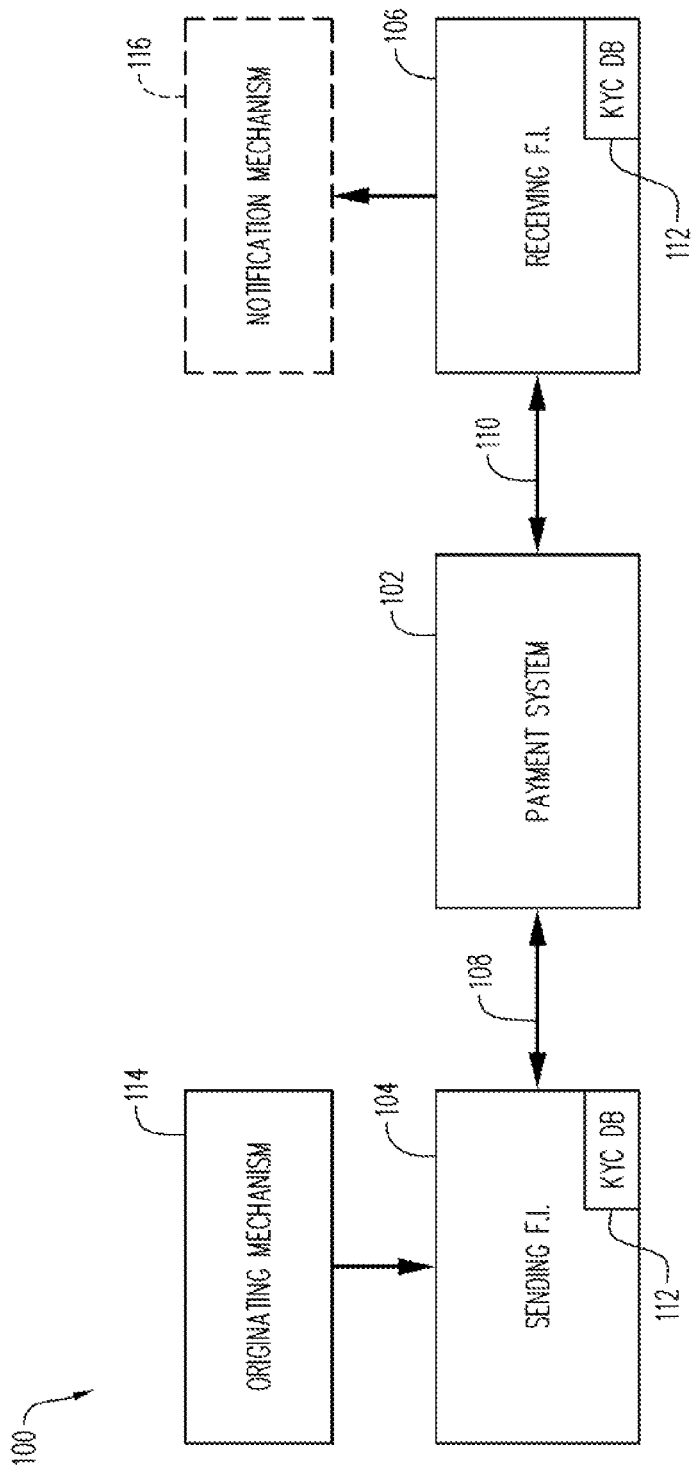
FIG. 1 is a block diagram that illustrates an international remittance system provided according to some aspects of the present invention.

FIG. 1 is a block diagram that illustrates an international remittance system 100 provided according to some aspects of the present invention.

At the heart of the remittance system 100 is a payment system 102. As will be seen, the payment system 102 operates to route and clear funds transfers from the payment card accounts of senders to the payment card accounts of recipients. One example of a suitable payment system is the Banknet system, which is well-known to those who are skilled in the art, and which is operated by the assignee hereof.

A major strength of a payment system such as the Banknet system is that it interlinks numerous financial institutions around the world. In practice the remittance system 100 may include many financial institutions that act as issuers of payment card accounts, but for purposes of illustration only two such FIs are shown in FIG. 1, namely the financial institution (sending FI 104) that issued the payment card account of the sender of a remittance, and the financial institution (receiving FI 106) that issued the payment card account of the recipient of the remittance. As indicated respectively at 108 and 110, the sending FI 104 and the receiving FI 106 are both connected by suitable data communication paths to the payment system 102. It may be assumed that the receiving FI 106 is located in a different country from FI 104 so that any remittance transmitted between the two FIs 104, 106 is an international remittance.

It may also be assumed that the FIs 104, 106, and the other FIs included in the remittance system 100 but not depicted in the drawings, are banks or other organizations that are subject to regulation to assure compliance with KYC and AML requirements. It may also be assumed that the FIs have internal procedures in place to comply with KYC and AML requirements. Consequently, upon or prior to opening a payment card account for a customer, each FI gathers information about the customer, such as the customer's full name, and residential address. Customary procedures may also call for the FI to obtain documentary proof of the customer information. The documentary proof may be a driver's license, a passport, an identity card, etc. To demonstrate compliance with the documentation procedures, the FI may also keep an image of the document(s) used to establish the customer's identity and address. Accordingly, each FI is shown as maintaining a KYC information database 112 in which the customer information, document images, etc., are stored.

Continuing with the concept that FIG. 1 shows components of the remittance system 100 with respect to a single remittance transaction, block 114 represents a mechanism by which the sender initiates a funds transfer. The mechanism 114, from which the funds transfer originates, may come in a number of different forms, such as the sender's mobile telephone (as described further below), an automatic teller machine (ATM), or a personal computer or other web-browsing device (from which the sender may access a website maintained by or on behalf of the sending FI 104). As another alternative, the sender may visit a bank branch to initiate the funds transfer, and may speak with an employee of the sending FI 104. In response to the sender's request, the sending FI employee may operate a personal computer or terminal to launch the funds transfer.

Also shown in FIG. 1 (in phantom) is a mechanism 116 that may be utilized by the receiving FI 106 to notify that recipient that the funds transfer has taken place. As will be seen, the notification mechanism may be the recipient's mobile telephone, to which the receiving FI may send a text message or automated telephone call. Other possible embodiments of the notification mechanism may include the recipient's home personal computer (by e-mail) or a pager.

Figure 2:
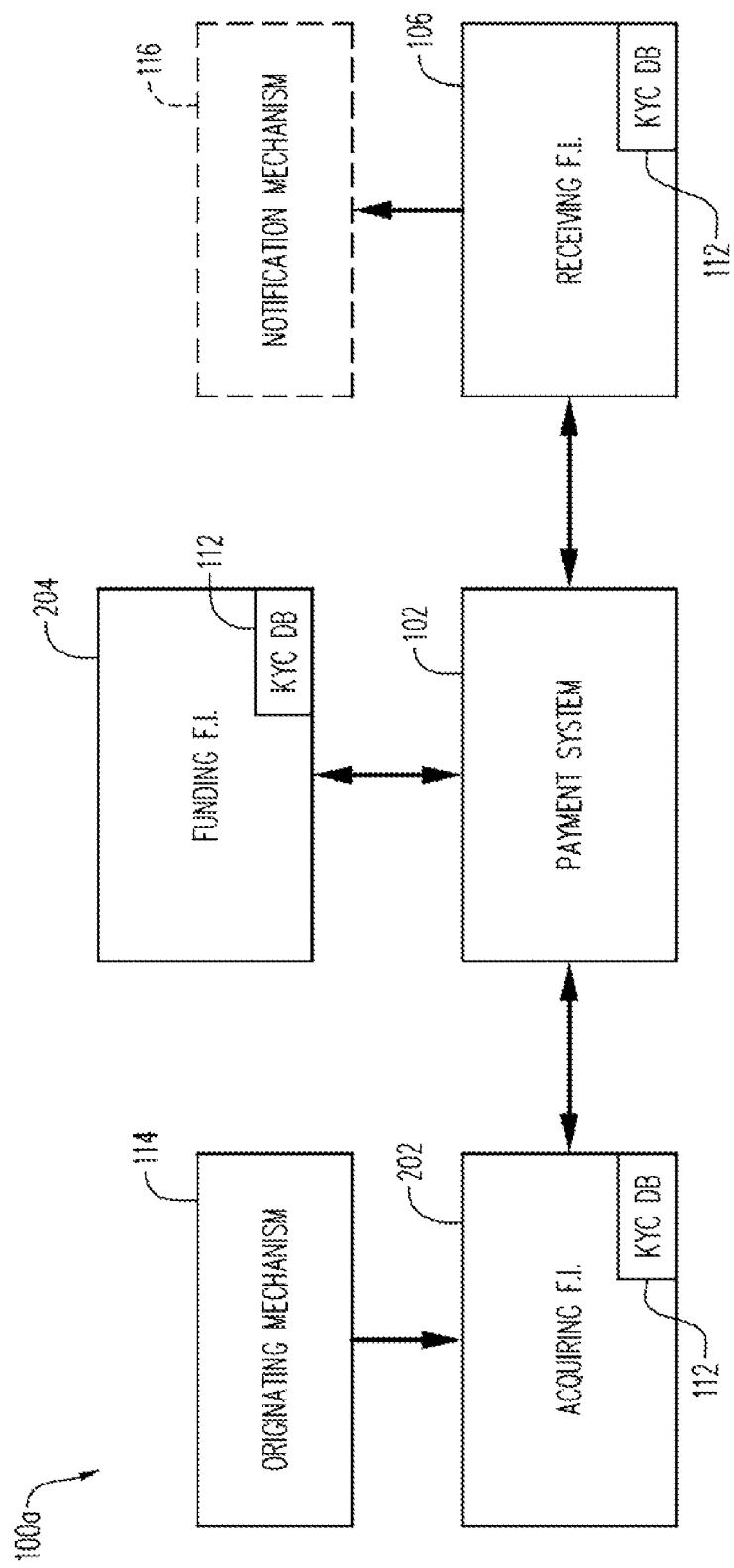
FIG. 2 is a block diagram that illustrates an international remittance system provided according to other aspects of the present invention.

FIG. 2 is a block diagram that shows a variation upon the remittance system 100 of FIG. 1. The remittance system shown in FIG. 2 is generally indicated by reference numeral 100a.

In the remittance system 100a of FIG. 2, at least some of the remittance transactions may be "three-cornered". That is, the sender originates the funds transfer via an acquirer FI 202, but the sender's payment card account from which the funds transfer is to be funded is maintained not by the acquirer FI 202 but rather is maintained by a funding FI 204, with which the sender has an established relationship. Accordingly, to accomplish the funds transfer (and as will be described in more detail below), the payment system 102 routes a request for authorization to fund the funds transfer from the acquiring FI 202 to the funding FI 204, and also ultimately routes the funds transfer itself to the receiving FI 106. The three FIs shown in FIG. 2 may be among a large number FIs that are not shown in FIG. 2 but that participate with the payment system 102, and thus are at least potentially capable of fulfilling one or more of the three FI roles portrayed in FIG. 2, namely acquirer, funding FI or receiving FI. Also each FI operates to comply with KYC/AML regulations, and thus stores a database 112 of information concerning its customers as required under KYC/AML regulations.

For purposes of FIG. 2, it may be assumed that the acquiring FI 202 and the funding FI 204 may be in the same country, and that the receiving FI 106 is in a different country, such that a funds transfer originating from acquiring FI 202 and funded through the sender's payment card account at funding FI 204, and routed via the payment system 102 to the receiving FI 106, is an international remittance. Alternatively, for example, all three FIs depicted in FIG. 2 may be in mutually different countries from each other. As another alternative, funding FI 204 and receiving FI 106 may be in the same country, and acquiring FI 202 may be in a different country. Still another possibility may be that the acquiring FI 202 and the receiving FI 106 are in the same country and the funding FI 204 may be in a different country.

Figure 3:
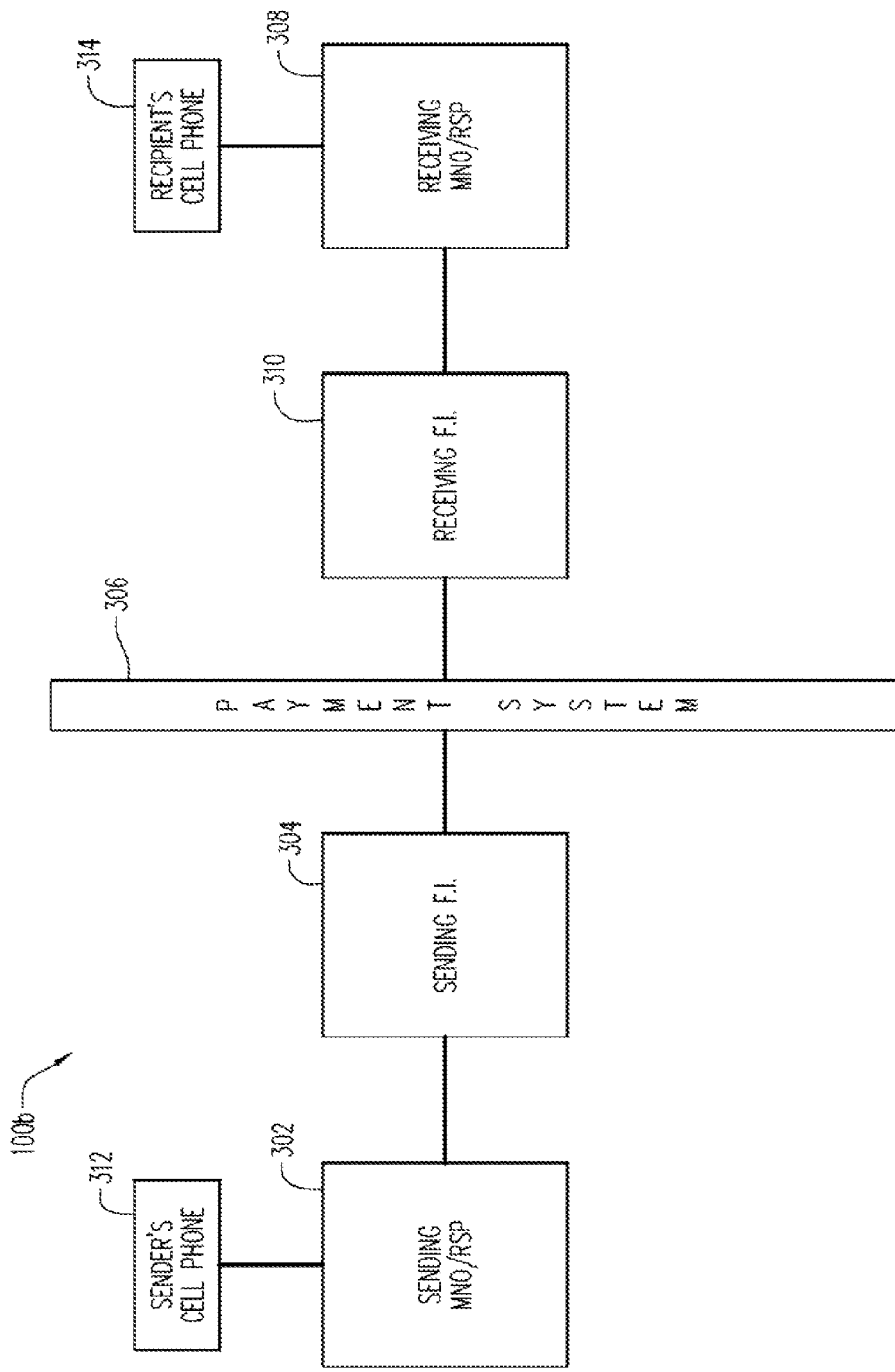
FIG. 3 is a block diagram that illustrates an international remittance system provided according to still other aspects of the present invention.

FIG. 3 is a block diagram that represents still another variation on a remittance system provided in accordance with the invention, or at least an alternative representation of the remittance systems shown in FIGS. 1 and 2. The remittance system as presented in FIG. 3 is generally represented by reference numeral 100b.

The remittance system 100b depicted in FIG. 3 may be assembled in part from existing infrastructure building blocks such as a mobile network operator (MNO) 302 which operates in country X and in this embodiment also functions as a remittance services provider (RSP). Another building block is an FI 304 (designated the sending FI for purposes of illustration) which is located in country X and has an established relationship both with the MNO 302 and with an existing payment system 306 such as the Banknet system that was previously referred to. Similarly, the remittance system 100b incorporates an MNO 308 that operates a mobile network and as an RSP in country Y (a different country from country X). Also in country Y is another FI 310 that has established relationships with the MNO 308 and with the payment system 306.

A significant feature of the remittance system 100b is that it may leverage on the wide availability of mobile telephones, even in developing countries, such that mobile telephones may serve as customers' point of access to, and contact from, the remittance system 100b. In the particular example illustrated in FIG. 3, a remittance transaction sender's mobile telephone 312 is shown and may be one of many mobile telephones (not shown) that operate within the network of the MNO 302 in country X. Also shown is a recipient's mobile telephone 314 that may be one of many mobile telephones (not shown) that operate within the network of the MNO 310 in country Y.

Although FIG. 3 shows salient aspects of the end-to-end infrastructure for a single international remittance, in practice a remittance system such as the system depicted in FIG. 3 may include MNO/RSPs and FIs in many countries, and may encompass more than one MNO/RSP and more than one FI within at least some countries. For example, in at least some countries a considerable number of MNOs and/or FIs may participate in the remittance system.

Also, as discussed in connection with FIGS. 1 and 2, the FIs that participate in the remittance system 100b may all register customers, store customer information, and exchange information with other FIs in a manner that satisfies local and international KYC/AML requirements. In some cases, the MNO/RSPs may operate as agents for the FIs to gather customer registration information.

Figure 4:
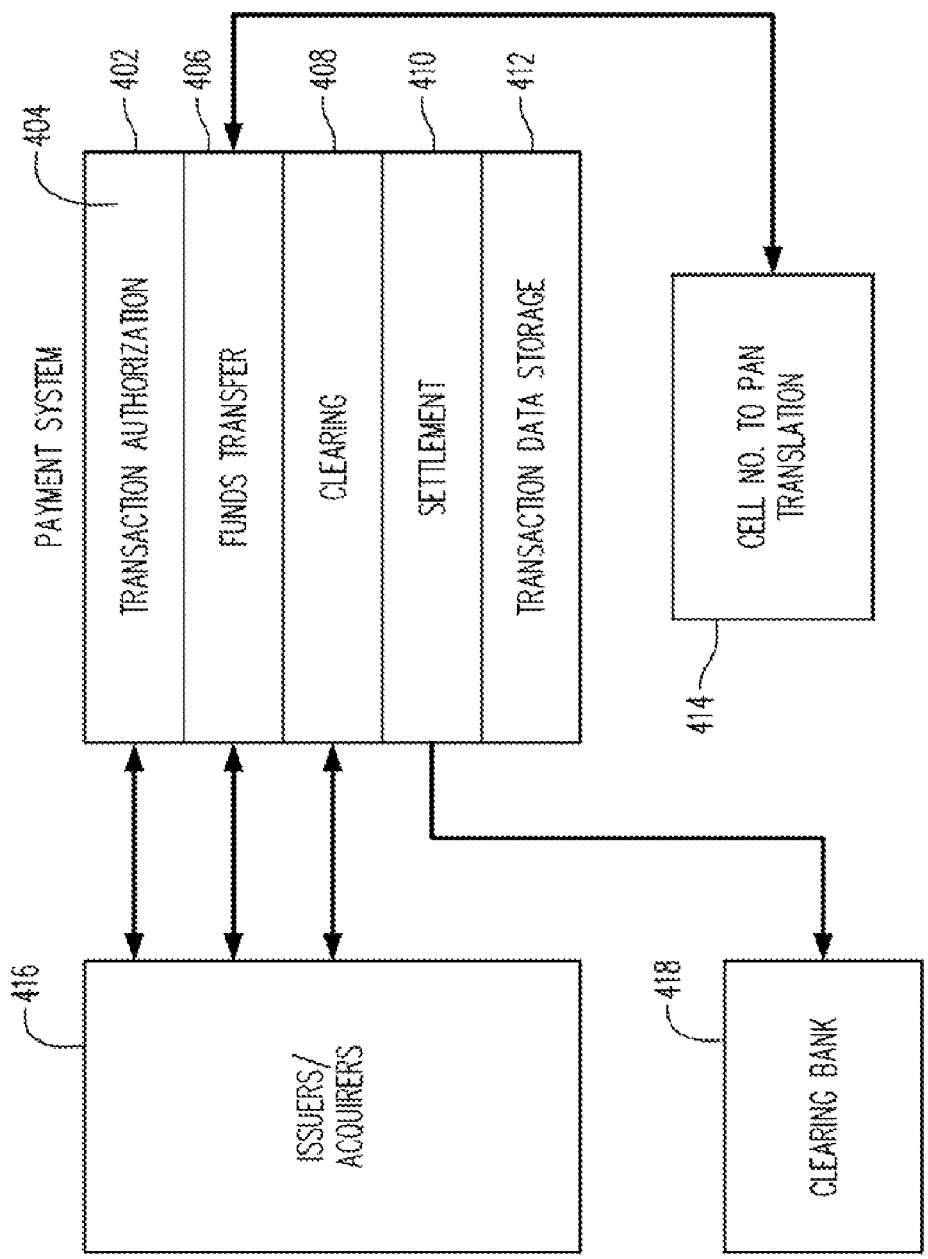
FIG. 4 is a block diagram that illustrates certain details of data processing capabilities that may be present in one or more of the remittance systems of FIGS. 1-3.

FIG. 4 is a block diagram that illustrates certain details of data processing capabilities that may be present in one or more of the remittance systems of FIGS. 1-3.

Particularly highlighted in FIG. 4 are data processing capabilities represented at block 402 and operated by or on behalf of the payment system 102 or 306 in FIGS. 1-3. Functions provided by the payment system data processing operations (e.g., one or more servers or other computers) 402 may include transaction authorization routing 404, handling of funds transfer transactions 406, transaction clearing 408, transaction settlement 410 and storage 412 of data relating to transactions handled by data processing operation 402. To facilitate usage of mobile telephone numbers as destination and/or source addresses for funds transfers, the payment system 306 or 102 may also provide a data processing capability (e.g., a server computer) 414 which interacts with funds transfer handling component 406 to respond to requests by translating customers' mobile telephone numbers into customers' destination and/or source payment card account numbers.

Also shown in FIG. 4 are computers 416 operated by FIs which issue payment card accounts to customers and/or which acquire funds transfer or purchase transactions. The payment system computer(s) 402 exchange communications with the acquirer/issuer computers 416, including communications to implement functions provided in accordance with aspects of the present invention. The payment system computer(s) 402 are also in communication with a bank computer 418 that handles settlement of transactions among acquiring and issuing FIs.

Figure 5:
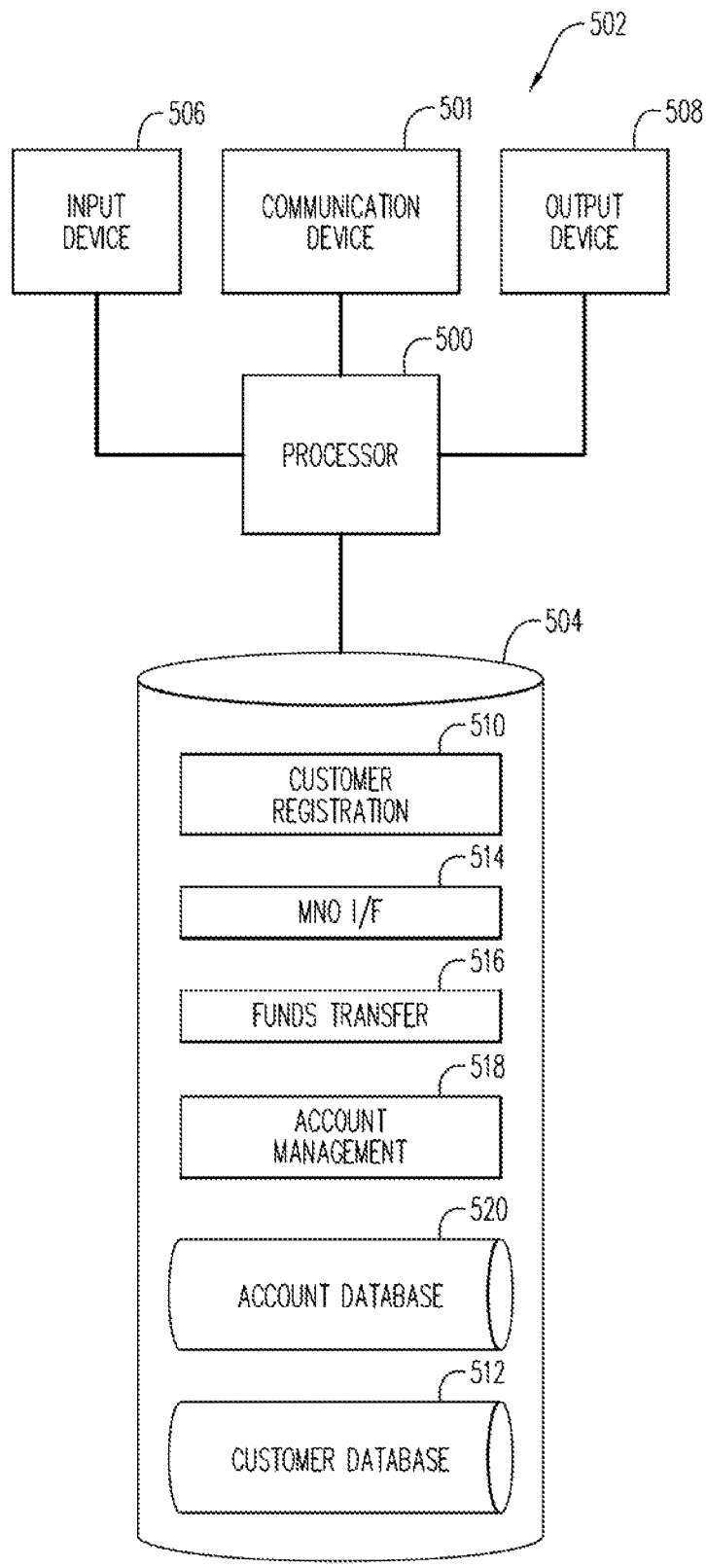
FIG. 5 is a block diagram representation of a computer system that may be operated by a financial institution in one or more of the remittance systems of FIGS. 1-3.

FIG. 5 is a block diagram representation of a computer system 502 that may be operated by a financial institution (e.g., any one of FIs 104, 106, 202 or 204) in one or more of the remittance systems of FIGS. 1-3.

The computer system 502 may be conventional in its hardware aspects but may be controlled by software to cause it to operate in accordance with aspects of the present invention.

The computer system 502 may include a computer processor 500 operatively coupled to a communication device 501, a storage device 504, an input device 506 and an output device 508.

The computer processor 500 may be constituted by one or more conventional processors. Processor 500 operates to execute processor-executable steps, contained in program instructions described below, so as to control the computer system 502 to provide desired functionality.

Communication device 501 may be used to facilitate communication with, for example, other devices (such as computers operated by the payment system 102 or 306 or one of the MNOs 302 or 308).

Input device 506 may comprise one or more of any type of peripheral device typically used to input data into a computer. For example, the input device 506 may include a keyboard and a mouse. Output device 508 may comprise, for example, a display and/or a printer.

Storage device 504 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 504 stores one or more programs for controlling processor 200. The programs comprise program instructions that contain processor-executable process steps of computer system 502, including, in some cases, process steps that constitute processes provided in accordance with principles of the present invention, as described in more detail below.

The programs may include an application 510 that allows the computer system 502 to receive and store information submitted by a prospective customer who is seeking to open a payment card account with the FI that operates computer system 502. The data thus received may be stored in a customer database 512 stored on the storage device 504. Details of the customer database 512 will be discussed below.

In addition the programs may include an application 514 that controls the computer system 502 to allow computer system 502 to interact with an MNO which is also serving at least some of its customers as a remittance services provider, and for that purpose exchanges data with the computer system 502.

Application 516 is another application that may be included in the programs stored in the storage device 504. Application 516 may include software program instructions to control the computer system 502 to handle funds transfer transactions in a manner to be described below.

Further, the programs stored in the storage device 504 may include an application 518. Application 518 may control the computer system 502 to manage the payment card accounts issued by the FI that operates the computer system 502. In addition to managing the payment card accounts with respect to funds transfer transactions made from and/or to the accounts, the application 518 may also handle other payment card account transactions, including conventional purchase transactions.

Storage device 504 may also store a database 520 that contains data concerning account balances and records of transactions performed with respect to the payment card accounts. In some embodiments, records of transactions may be stored in a separate database (not shown) that is apart from the account database 520

FIG. 6 is an illustration in tabular form of an example of the customer database 512 stored on the storage device 504 of the computer system 502. Although for illustrative purposes only three records are shown in the example customer database 512, in practice the customer database 512 may include thousands of records, corresponding to thousands of customers and thousands of payment card accounts.

In the example customer database 512 shown in FIG. 6, column 602 contains entries that store the names of customers who hold payment card accounts issued by the FI that operates the computer system 502. (In some embodiments, the customer database 512 may also contain records of other customers of the FI, including customers that do not hold payment card accounts issued by the FI.)

Column 604 in the example customer database 512 contains entries that store the residential addresses of the customers listed in column 602. In column 606 the entries store the payment card account numbers that identify the payment card accounts held by the customers. These payment card account numbers may be used by the customers for conventional purposes, such as purchase transactions at retail stores or on-line. In addition, in accordance with aspects of the invention, the payment card accounts may be used to indicate the destination accounts for incoming remittances.

Column 608 lists entries that store the customers' mobile telephone numbers. These may be numbers that address mobile telephones served by a MNO that has partnered with the FI to provide remittance services to the MNO's subscribers.

The entries in column 610 may store data that represents, for each customer, the image of one or more documents that the customer submitted upon registering as a customer of the FI. The documents may have served to verify the identity and residential address of the customer.

In other embodiments, the customer database may store other types of data in addition to or instead of the types of data illustrated in FIG. 6.

Figure 7:
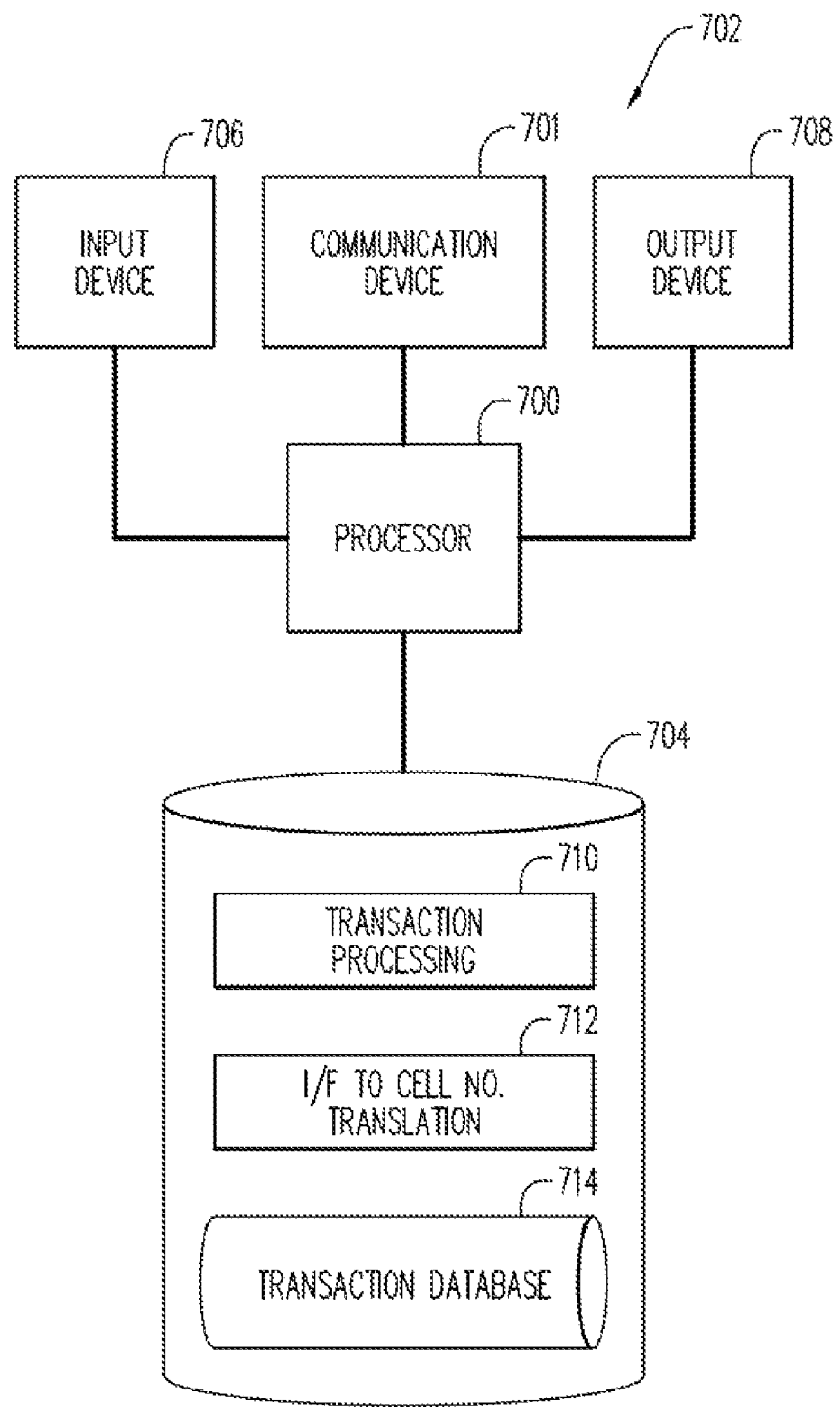
FIG. 7 is a block diagram representation of a computer system that may be operated by a payment system that is at the heart of one or more of the remittance systems of FIGS. 1-3.

FIG. 7 is a block diagram representation of a computer system 702 that may be operated by one of the payment systems 102, 306 that is at the heart of one of the remittance systems of FIGS. 1-3.

In its hardware aspects, the computer system 702 may be conventional, and similar to the hardware components described above in connection with the computer system 502. The hardware aspects of the computer system 702 will therefore not be further described, except to mention that the computer system 702 may include a processor 700 in communication with a communication device 701, a storage device 704, an input device 706, and an output device 708.

The storage device 704 may store an application program 710 to control the computer system 702 to handle transactions that flow through the payment system. The transactions may include conventional purchase transactions, and also funds transfer transactions as described herein. To facilitate use of customer's mobile telephone numbers as destination and/or sending addresses for funds transfers, the storage device may also store an application program 712 that controls the computer system 702 to exchange communications with the mobile-telephone-number-to-payment-card-account-number translation server computer 414 referred to above in connection with FIG. 4.

Continuing to refer to FIG. 7, the storage device 704 may also store a database 714 of data that reflects the transactions, including funds transfer transactions, handled by the computer system 702. (In some embodiments, the transaction database 714 may be stored in a data warehouse that is separate from, but in communication with, the computer system 702.)

Figure 8:
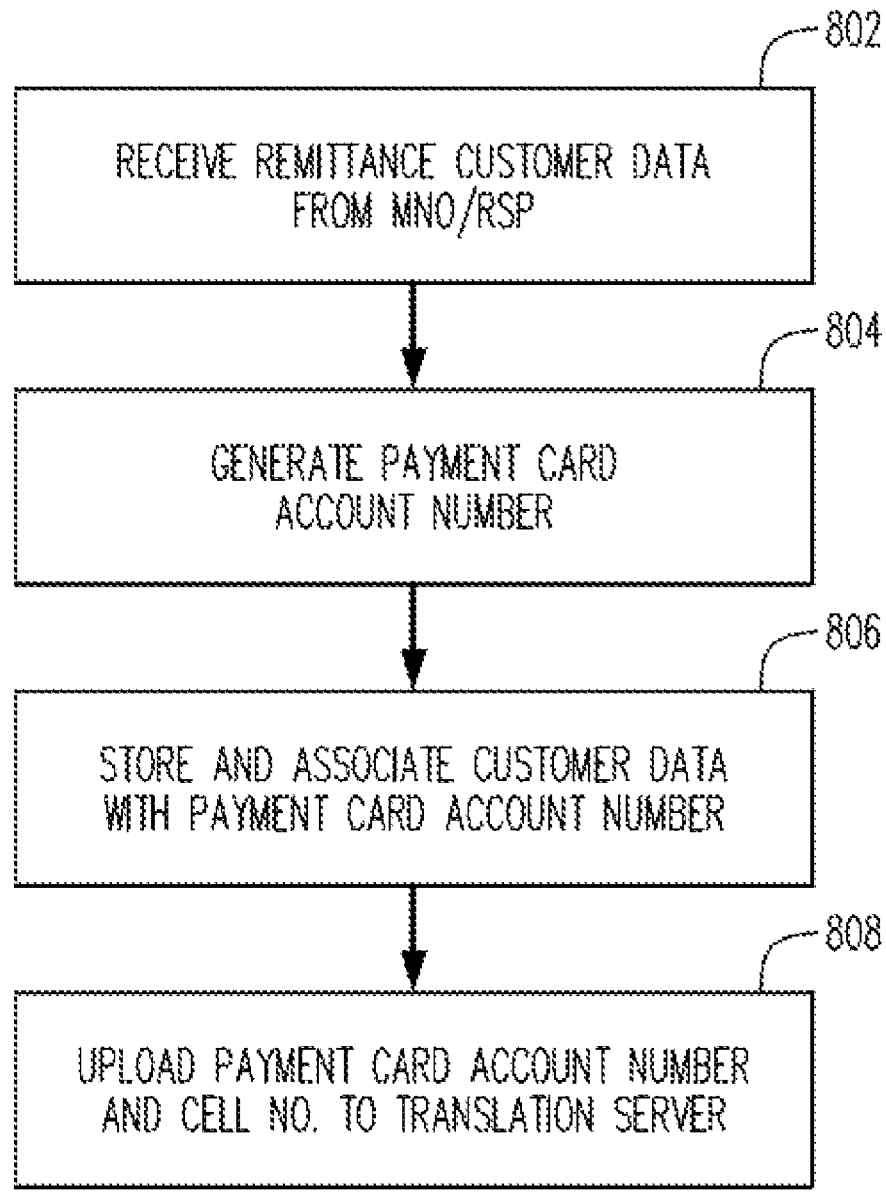
FIG. 8 is a flow chart that illustrates a process that may be performed by a financial institution in connection with registering a customer of one or more of the remittance systems of FIGS. 1-3.

FIG. 8 is a flow chart that illustrates a process that may be performed by a financial institution in connection with registering a customer of one or more of the remittance systems of FIGS. 1-3.

The process of FIG. 8 is premised on a situation in which a subscriber of an MNO applies to become a customer of the MNO in respect of remittance services provided by the MNO. In this situation, the MNO subscriber/prospective remittance services customer becomes a customer of an FI that is partnering with the MNO to provide remittance services, and the relationship between the remittance services customer and the FI arises as a result of the customer's interactions with the MNO. Moreover, in such a situation, the MNO may act as an agent of the FI to enable the FI to satisfy the FI's obligations under KYC regulations. Thus the MNO obtains from the prospective remittance customer documentation to verify the customer's identity and residence address. The MNO captures an image of the documentation and transmits the image data to the FI together with the customer's name, residential address, and mobile telephone number.

At 802 in FIG. 8, the FI computer system 502 receives from the MNO/RSP the customer information enumerated in the preceding sentence. At 804, the FI computer system 502 opens a new payment card account in the name of the customer and generates a payment card account number to identify the new account. At 806, the FI computer system 502 stores the customer information, including the customer's mobile telephone number and identification document image data, in association with the customer's new payment card account number, by creating a new entry in the customer database 512 (FIGS. 5 and 6).

Continuing to refer to FIG. 8, at 808 the FI computer system 502 transmits, to the mobile-telephone-number-to-payment-card-account-number translation server 414 (FIG. 4), the customer's mobile telephone number in association with the customer's new payment card account number.

Figure 9:
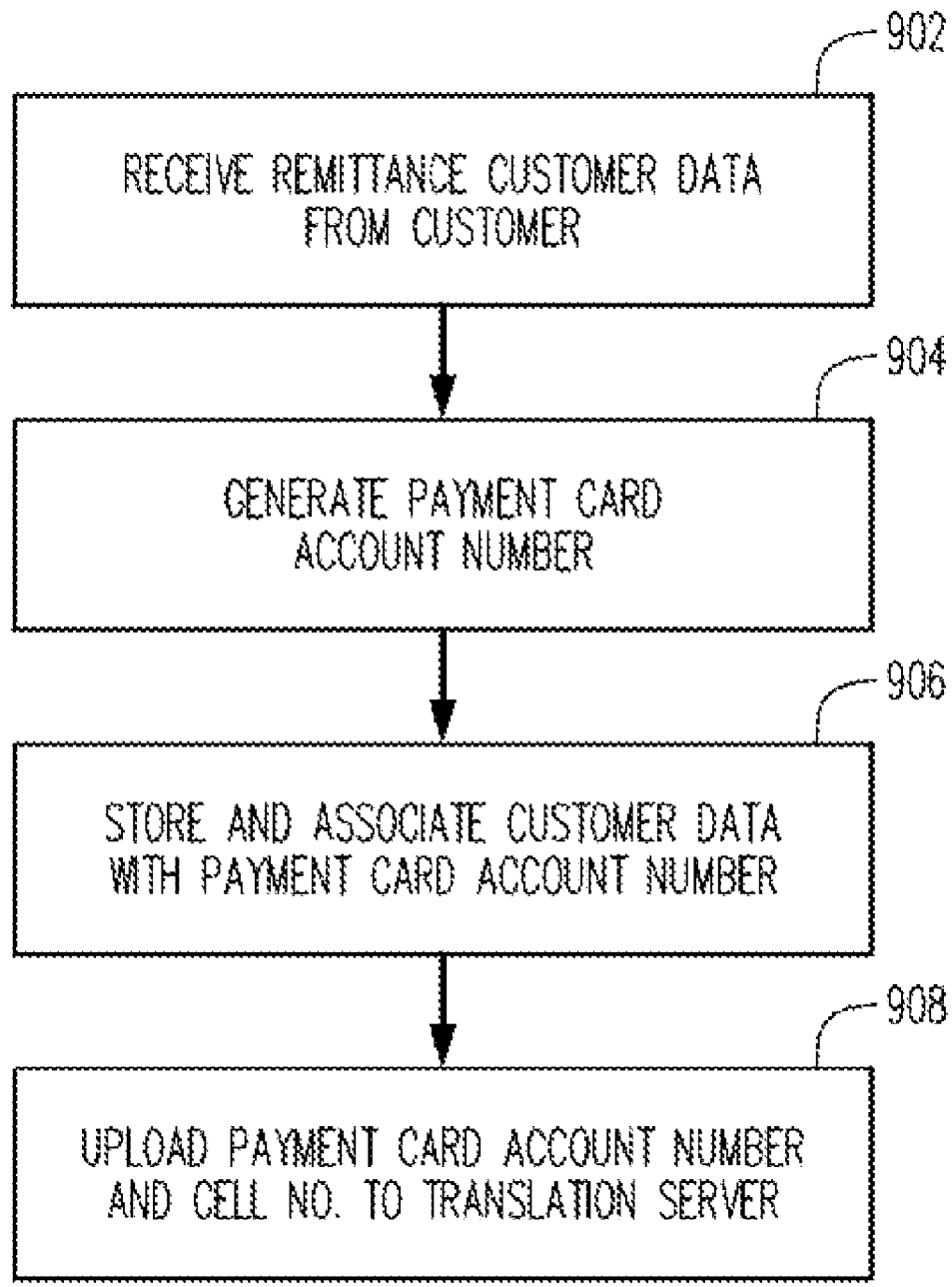
FIG. 9 is a flow chart that illustrates an alternative process that may be performed by a financial institution in connection with registering a customer of one or more of the remittance systems of FIGS. 1-3.

FIG. 9 is a flow chart that illustrates an alternative process that may be performed by a financial institution in connection with registering a customer of one or more of the remittance systems of FIGS. 1-3.

The process of FIG. 9 is premised on the customer interacting directly with the FI to register for remittance services. It is assumed that the customer is already a customer with the FI's MNO/RSP partner, or that the FI's mobile telephone based remittance services are open to operate with all local MNOs.

At 902 an employee of the FI collects the customer's name, residential address, and mobile telephone number and also scans the customer's identification documentation, and inputs the resulting data into the FI computer system 502. At 904, the FI computer system 502 opens a new payment card account in the name of the customer and generates a payment card account number to identify the new account. At 906, the FI computer system 502 stores the new payment card account number in association with the customer information, including the customer's mobile telephone number and identification document image data.

Continuing to refer to FIG. 9, at 908 the FI computer system 502 transmits, to the mobile-telephone-number-to-payment-card-account-number translation server 414 (FIG. 4), the customer's mobile telephone number in association with the customer's new payment card account number.

The "know your customer/anti-money laundering" (KYC/AML) databases referred to herein may be constituted by a single database in the case of each FI or may alternatively be constituted by two or more separate and/or interrelated databases, such as one database for registration of customers, and another database for recording transactions.

In another scenario according to aspects of the invention, the customer may initially open a payment card account with an FI. In connection with the customer's payment card account, the FI may duly register the customer for KYC purposes, including data storage by the FI of the customer's name, residential address and image(s) of the customer's ID document(s). Thereafter, the customer may apply to his/her MNO (e.g., while signing up with a new MNO) to become a customer of the MNO's remittance service offering, and to have his/her mobile telephone number linked to his/her pre-existing payment card account number. The MNO may then notify the FI of the desired link between the customer's mobile telephone number and his/her payment card account number. The FI, in turn, may store data to indicate the link between the customer's mobile telephone number and the customer's payment card account number and may transmit a message indicative of that link (e.g., including the mobile telephone number and the payment card account number) to the mobile-telephone-number-to-payment-card-account-number translation server 414.

In still another scenario, an FI and an MNO may enter into an arrangement whereby the FI assigns a block of pseudo payment card account numbers (i.e., numbers in the same format as a payment card account number that identify the FI as the issuer). The MNO may assign numbers from the block of pseudo payment card account numbers to customers who sign up for remittance services offered by the MNO. The pseudo payment card account numbers are to be used by the MNO and/or in the payment system for funding and/or routing remittance transactions. The MNO thus may link the customer's mobile telephone number to the pseudo payment card account number assigned to the customer, and may report the link between the mobile telephone number and the pseudo payment card account number to the payment system (and/or to the mobile-telephone-number-to-payment-card-account-number translation server 414) either directly or via the FI. The MNO may carry out KYC compliance as agent for the FI and may transmit customer registration information (e.g., name, residential address, image(s) of ID document(s)) to the FI for storage by the FI in association with the pseudo payment card account number assigned to the remittance services customer in question.

In yet another scenario, a customer who already has a payment card account with the FI may access a website operated by or on behalf of the FI. By interacting with the website, the customer may define a link between the customer's pre-existing mobile telephone number and the customer's pre-existing payment card account number. The FI may then transmit information indicative of that link to the mobile-telephone-number-to-payment-card-account-number translation server 414.

FIGS. 10A-10D together form a flow chart that illustrates a funds transfer process that may be performed in one or more of the remittance systems of FIGS. 1-3. (Although the process of FIGS. 10A-10D will be described primarily with reference to the remittance system 100b of FIG. 3, the description is also generally applicable to the remittance systems depicted in FIGS. 1 and 2.)

Figure 10A:
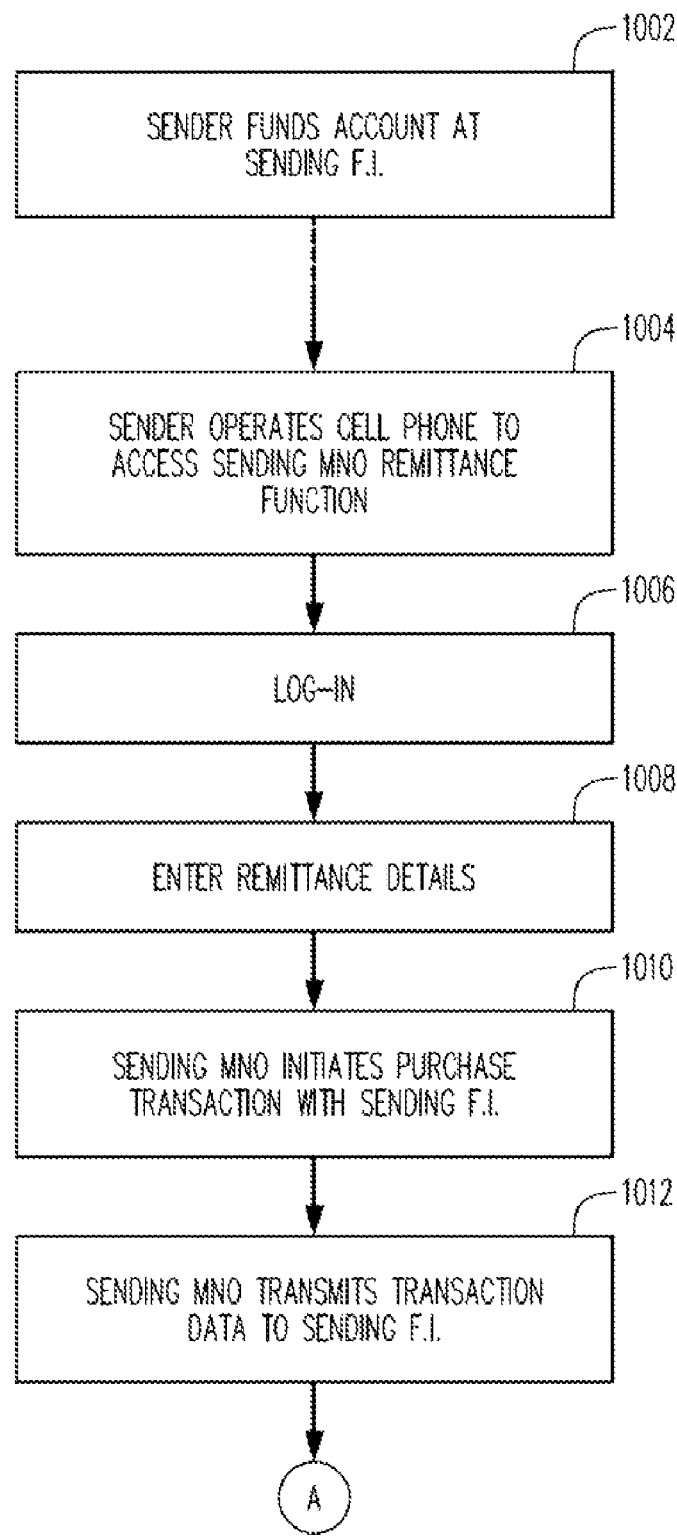
FIGS. 10A-10D together form a flow chart that illustrates a funds transfer process that may be performed in one or more of the remittance systems of FIGS. 1-3.

At 1002 in FIG. 10A, a customer of the sending FI 304 (FIG. 3) who intends in the future to make remittances using the remittance system 100b deposits funds in his/her account with the sending FI 304. (It is now being assumed that the account is a debit card account, but alternatively, the account may be a credit card account for which the customer has established sufficient creditworthiness to allow the account to provide cash advances.)

At 1004 (i.e., at some later point in time than 1002), the sender operates his/her mobile telephone 312 to access a remittance function provided by MNO 302. The sender then logs in (1006) to his/her remittance services account with the MNO 302. For example, as part of the log in procedure, the sender may be prompted to input his/her personal identification number (PIN). After log in, as indicated at 1008, the sender may be prompted to enter, and may accordingly enter, the details concerning his/her desired remittance transaction. In some embodiments only two items of information may be needed to define the transaction, namely (a) the amount of money to be transferred, and (b) the mobile telephone number of the desired recipient. Once the sender has entered this information, the MNO 302 initiates (1010) funding of the proposed remittance by initiating a payment card purchase transaction with the sending F. I. 304. The MNO 302 also transmits (1012) the transaction data to the sending F. I. 304, including the desired amount to be transferred and the destination mobile telephone number. In some embodiments and/or in some cases, the transaction data sent by the MNO 302 may include the mobile telephone number of the sender's mobile telephone. In other cases and/or in other embodiments, the MNO has the sender's payment card account number and transmits the sender's payment card account number to the sending FI 304.

Figure 10B:
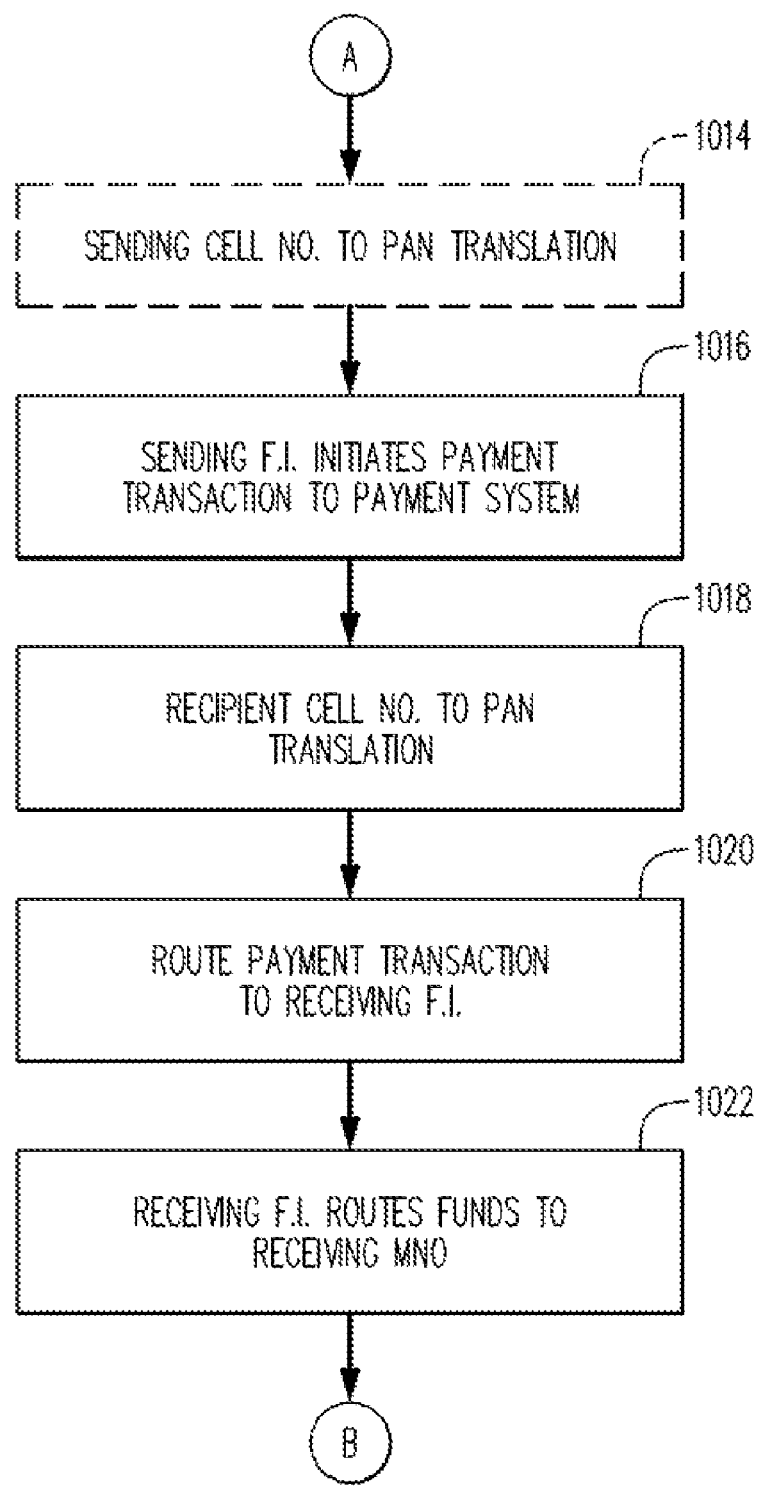
Figure 10C:
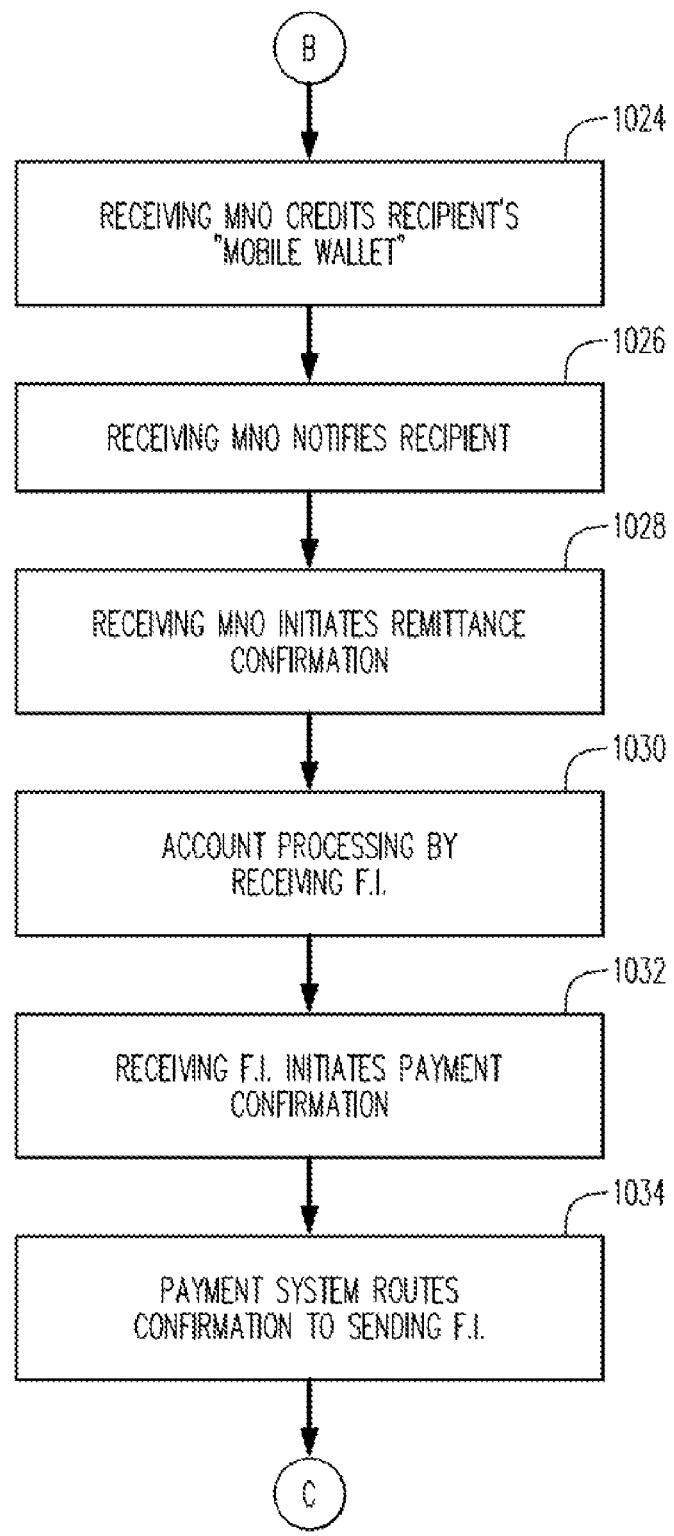
Figure 10D:
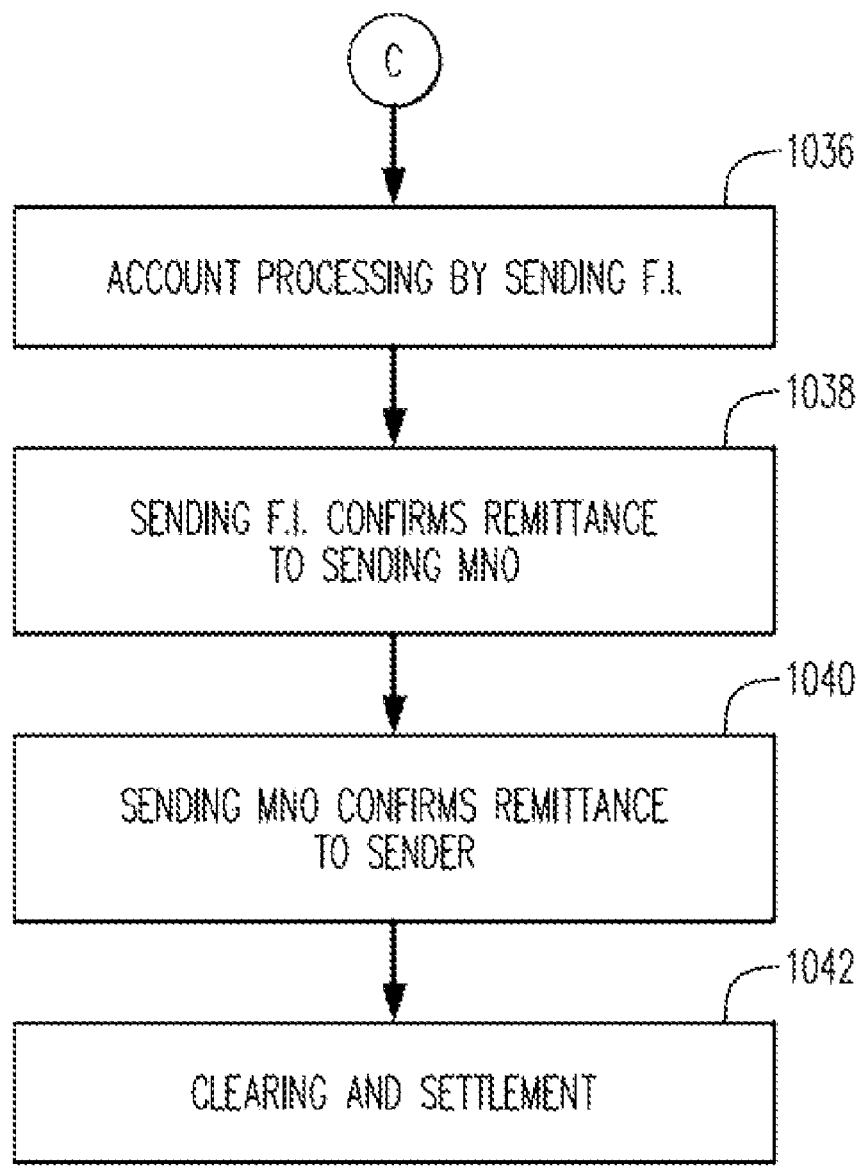

Referring to FIG. 10B, at 1014 (shown in phantom), if the sending MNO 302 provided the sender's mobile telephone number, rather than the sender's payment card account number, to the sending FI 304 as part of the transaction data, then the FI 304 may access the customer database 512 to translate the sender's mobile telephone number into the sender's payment card account number. Assuming that the sender has adequate funds in his/her account to support the proposed transaction, then at 1016 the sending F. I. 304 interacts with the payment system 306 to initiate a payment transaction. As is known to those who are skilled in the art, a "payment transaction" is one in which funds are to be transferred from the initiating FI to a target payment card account, rather than in the other direction, as is normally the case with a purchase transaction. The information provided to the payment system 306 from the sending FI 304 may include the sender's name, residential address, and payment card account, as well as the amount of the funds transfer and the recipient's mobile telephone number. The sending FI 304 may have assigned a unique transaction identification number to the remittance transaction, and this transaction identification number may also be provided to the payment system 306 by the sending FI 304.

At 1018, the payment system 306 translates the destination (recipient's) mobile telephone number into a destination (recipient's) payment card account number. For example, the payment system computer 702 may transmit the destination mobile telephone number to the translation server 414, as part of an inquiry. The translation server 414 may perform a database lookup to determine the recipient's payment card account number from the recipient's mobile telephone number. Then the translation server 414 may respond to the inquiry by transmitting the recipient's mobile telephone number to the payment system computer 702. The payment system computer 702 may receive the recipient's mobile telephone number from the translation server 414.

At 1020, using the recipient payment card account number, the payment system 306 may route the payment transaction to the receiving FI 310. The information transmitted from the payment system 306 to the receiving FI 310 may include the sender's name and residential address and possibly also the sender's payment card account number. The information transmitted from the payment system 306 to the receiving FI 310 may also include the unique transaction number assigned by the sending FI 304, as well as the identification number of the sending FI.

At 1022, the receiving FI 310 may route the funds transfer to the "mobile wallet" function of the receiving MNO 308. Alternatively, the receiving FI 310 may route the funds transfer to the payment card account of the recipient. At 1024 in FIG. 10C, the receiving MNO 308 may process the transaction and credit it to the recipient's mobile wallet account.

At 1026, the receiving MNO 308 may notify the recipient that his/her account (mobile wallet or payment card account at receiving FI 310) has received the funds transfer. This may be done, for example, by automatically sending a text message or computer generated audio message to the recipient's mobile telephone 314. At 1028, the receiving MNO 308 may initiate a remittance confirmation that is transmitted by the receiving MNO 308 to the receiving FI 310. The remittance confirmation may include the destination payment card account that was credited and that was tied to the recipient's mobile telephone number. At 1030, the receiving FI 310 may perform account processing in accordance with an existing agreement with the receiving MNO 308.

At 1032, the receiving FI may initiate a payment confirmation. The payment confirmation may include the recipient's payment card account number, and may also include the recipient's name and residential address. The receiving FI may transmit the payment confirmation to the payment system 306.

At 1034, the payment system 306 may route the payment confirmation to the sending FI 304. The confirmation message to the sending FI 304 may include an indication of the recipient payment card account and of the receiving FI to which the funds transfer was routed. The confirmation message to the sending FI 304 may also include the recipient's name and residential address. At 1036 (FIG. 10D), the sending FI 304 may perform account processing in accordance with an existing agreement with the sending MNO 302. At 1038, the sending FI 304 transmits a remittance confirmation message to the sending MNO 302.

At 1040, the sending MNO 302 transmits a message to the sender to confirm that the remittance has occurred. For example, the sending MNO 302 may send a text message or a computer-generated audio message to the sender's mobile telephone 312. In addition or alternatively, the sending MNO 302 may provide notice of completion of the remittance to the sender in another manner, such as by e-mail.

Block 1042 represents clearing and settlement of the remittance transaction. For example, the sending and receiving FIs may sending clearing files to the payment system 306 based on the payment card account numbers of the sender and the recipient of the funds transfer. The payment system 306 may handle settlement of the transactions, including, e.g., instructing its clearing bank (not shown) to transfer funds between respective accounts belonging to the sending FI 304 and the receiving FI 310.

Some highlights of the process of FIGS. 10A-10D will now be noted.

From the point of view of the sender and the recipient, the remittance transaction may be virtually "mobile-to-mobile". For example, the sender may only need to know the recipient's mobile telephone number (and possibly also the sender's PIN for the remittance system) and may initiate the remittance transaction with the same amount of effort, or little more, as may be required to place an international (e.g.) telephone call. It may not be necessary for the sender to know the payment card account number assigned to the recipient. This is advantageous since (a) the recipient's mobile telephone number may be considerably easier for the sender to recall than the recipient's payment card account number (especially if the sender is in the habit of telephoning the recipient); and (b) it allows the recipient to keep from disclosing his/her payment card account number to the sender. Further, in at least some cases, the funds transferred may be used by the recipient via a "mobile wallet" application on the recipient's mobile telephone, thereby providing the convenience and security of a cashless mobile payment appliance. Among other advantages, if the recipient accesses the funds via a "mobile wallet", the recipient may be freed from visiting a retail store or bank branch to obtain access to the transferred funds. Automated notification to the recipient by his/her mobile telephone of the completion of the funds transfer may further add to the convenience, both for sender and recipient, since the recipient gains rapid and easy notification, and the sender is not required to take separate steps to notify the recipient that the sender has caused the funds transfer to occur.

The process of FIGS. 10A-10D may also be highly convenient and cost effective for the MNOs and FIs. The entire transaction process from end-to-end may be automated and unattended. Moreover, for its "backbone" the remittance system described with reference to FIGS. 3 and 10A-10D may use a highly efficient, reliable and secure payment system of the kind currently in use for payment card systems. It is another salient and highly pertinent feature of payment card systems such as that of the assignee hereof that they already have the type of large scale and global scope that would support a large and widespread volume of remittance transactions.

Still further, with FIs involved at both ends, compliance with KYC customer registration requirements may be assured, and exchanges of KYC/AML information (e.g., sender name and residential address and/or recipient name and residential address) between the sending and receiving FIs via the payment system may be automatically incorporated with other data exchanges required to execute the monetary and accounting aspects of the remittance transaction. Thus the remittance system described above may provide a robust and cost-effective vehicle for assuring compliance with KYC/AML requirements, and may be much more reliable and less expensive in that regard than conventional remittance channels.

The remittance system shown in FIG. 3 and further described with reference to FIGS. 10A-10B may be thought of as one example of a remittance system having a payment network (that also services payment card transactions) as its backbone. In contradistinction to the example remittance system shown in FIG. 3, and in accordance with other aspects of the invention, alternative remittance systems may not have mobile telephones as the initiating mechanism and/or as the destination for the funds transfers, or mobile telephones may be one of a number of different mechanisms for initiating transfers, or one of a number of different ways of receiving remitted funds.

Figure 11A:
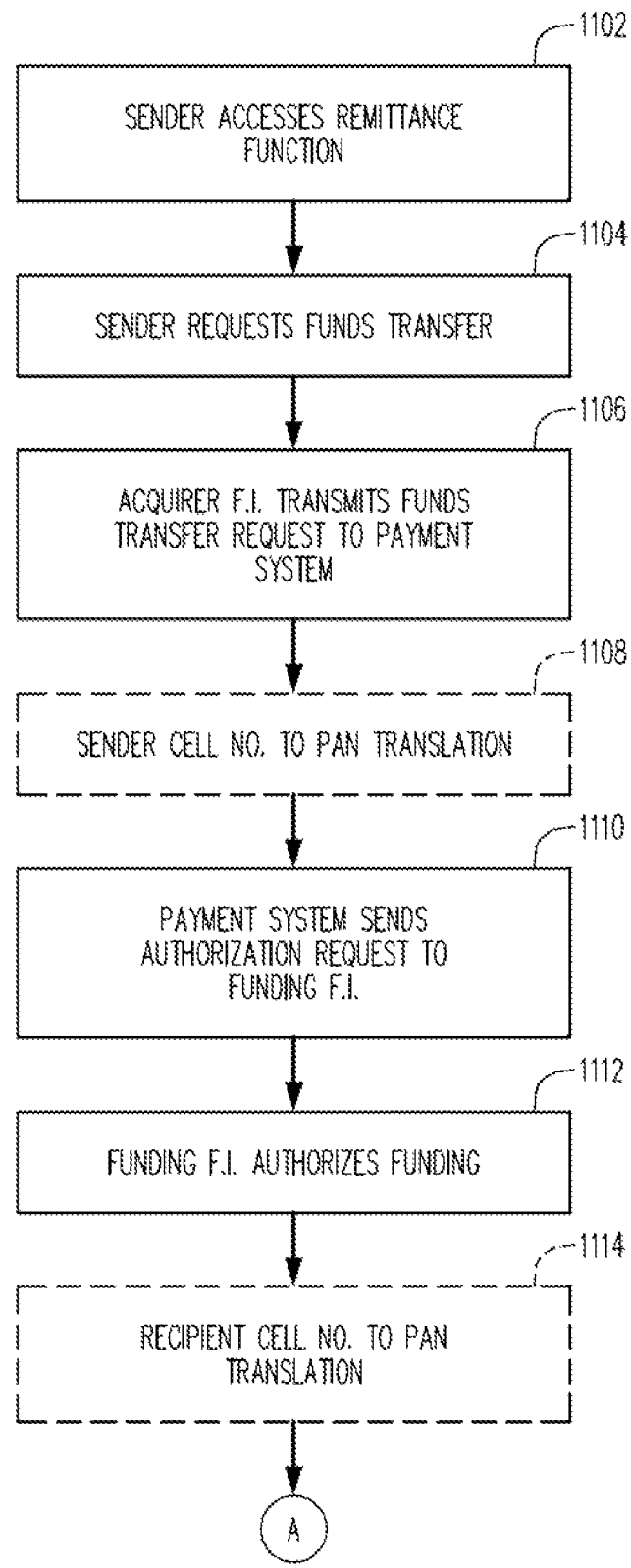
FIGS. 11A-11B together form a flow chart that illustrates a funds transfer process that may be performed in the remittance system of FIG. 2.
Figure 11B:
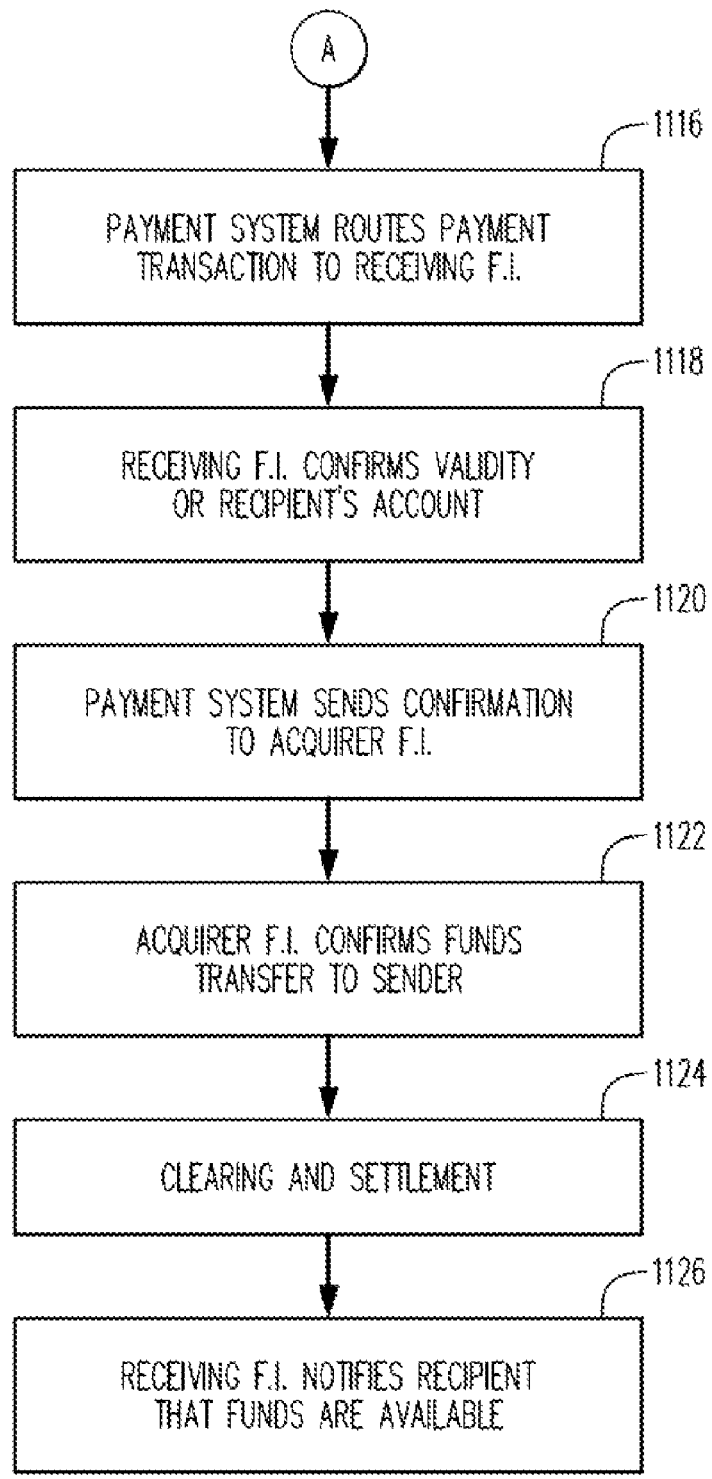

Further to this point, FIGS. 11A and 11B form a flow chart that illustrates a process that may be performed in accordance with aspects of the invention in the remittance system of FIG. 2. The process of FIGS. 11A-11B may be considered to be "agnostic" as to whether mobile telephones are used at either the sending or receiving ends of the remittance system. It also need not be the case that the destination of the funds transfer be indicated by the sender in terms of the recipient's mobile telephone number.

At 1102 in FIG. 11A, the sender obtains access to a function for initiating a funds transfer transaction in the remittance system 100a of FIG. 2. This may occur by the sender operating an originating mechanism 114 shown in FIG. 2. The originating mechanism may be a personal computer or the like used by the sender to access a remittance services web page hosted by a server computer (not separately shown) operated by or on behalf of the acquiring FI 202. Alternatively, the originating mechanism 114 operated by the sender may be an ATM or a kiosk. As still another alternative, the sender may visit a branch of the acquiring FI 202 or a retail store that serves as a remittance services outlet for the acquiring FI 202. In the latter cases, the originating mechanism 114 may be a terminal or computer operated by a bank teller or store clerk in response to the sender's request. Still further, the originating mechanism 114 may be the sender's mobile telephone, operated by the sender in a similar fashion to that described with reference to the process of FIGS. 10A-10D.

At 1104, the sender requests that a funds transfer take place. To do so, the sender may specify the amount to be remitted, and the recipient. Rather than identifying the recipient by name, the sender may input the recipient's payment card account number. Alternatively, the sender may identify the destination for the funds transfer solely by the recipient's mobile telephone number, as in the example of FIGS. 10A-10D. Further, it will be assumed for the purposes of this example that the sender either does not have a payment card account with the acquiring FI 202 (indeed, the acquiring FI 202 need not even be an issuer of payment card accounts) or simply wishes to fund the remittance from the sender's payment card account at the funding FI 204. Therefore, the sender may be required to input the payment card account number that identifies his/her payment card account at the funding FI 204. Alternatively, the sender may effectively identify the funding payment card account by inputting his/her mobile telephone number. As another alternative, in a case where the sender is using his/her mobile telephone as the originating mechanism 114, the acquiring FI 202 may obtain the telephone number for the sender's mobile telephone by a caller identification function, with the sender's mobile telephone number again to be used to identify the funding payment card account.

In any event, and by whatever mechanism, the sender transmits sufficient information to the acquiring FI 202 to define the desired funds transfer, and the acquiring FI 202 receives the information, possibly including information (e.g., sender's mobile telephone number) generated automatically and not specifically input by the sender. Then, at 1106, the acquiring FI 202 transmits to the payment system 102 a request for the funds transfer. The request may include, for example, information (payment card account number or sender's mobile telephone number) to identify the funding payment card account, the monetary amount to be transferred, and information (recipient's payment card account number or recipient's mobile telephone number) needed to route the funds transfer for the benefit of the recipient.

In the case where the request from the acquiring FI 202 identifies the funding payment card account only by the sender's mobile telephone number, the payment system 102 may perform or request translation of the sender's mobile telephone number to the sender's payment card account number (as indicated in phantom at 1108 in FIG. 11A). This may be done, for example, by the payment system 102 querying a mobile-telephone-number-to-payment-card-account-number-translation server like the server 414 discussed above in connection with FIG. 4.

At 1110 in FIG. 11A, the payment system 102 routes to the funding FI 204 a request to authorize funding of the funds transfer. The payment system 102 may route the request to authorize funding based on the sender's payment card account number, as either specified in the request from the acquiring FI 202 or as obtained by translating the sender's mobile telephone number, which was specified in the request from the acquiring FI 202.

Assuming that the sender's payment card account number, as utilized for routing by the payment system 102, is valid, and that there are adequate funds or an adequate facility for credit in the sender's payment card account, then the funding FI 204 may authorize the funding of the funds transfer, as indicated at 1112 in FIG. 11A. To indicate that funding of the funds transfer is authorized, the funding FI 204 may send an appropriate message/response to the payment system 102. In the same message/response or in a separate message, the funding FI 204 may transmit to the payment system 102 information about the sender such as the sender's name and residential address. This information may be in the KYC database 112 maintained by the funding FI 204 with respect to its customers and may be utilized to satisfy KYC/AML requirements of one or more of the acquiring FI 202, the receiving FI 106 and the payment system 102. In conjunction with authorizing the funds transfer from the sender's payment card account, the funding FI 204 may put a hold on the sender's payment card account to the extent of the amount authorized for the funds transfer.

Thereafter (or possibly prior thereto) the payment system 102 may perform or request translation of the recipient's mobile telephone number into the recipient's payment card account number. It will be appreciated that this may be necessary in the event that the destination for the funds transfer was only specified by the acquiring FI 202 as the recipient's mobile telephone number. This step is indicated in phantom at 1114 and may be done, for example, by the payment system 102 querying a mobile-telephone-number-to-payment-card-account-number translation server like the server 414 discussed above in connection with FIG. 4. The description of step 1018 in FIG. 10B may be essentially applicable to this step 1114.

At 1116 in FIG. 11B, and in response to the authorization from the funding FI 204, the payment system 102 uses the recipient's payment card account number (either received by the payment system 102 from the acquiring FI 202 or translated by or on request from the payment system 102 from the recipient's mobile telephone number received by the payment system 102 from the acquiring FI 202) to route the funds transfer to the receiving FI 106. If necessary to satisfy KYC/

AML requirements, the payment system 102 may, in the same message with the funds transfer or in a related message, transmit to the receiving FI 106 the sender's name and residential address which were received by the payment system 102 from the funding FI 204.

(In an exchange of information that is not explicitly represented in the drawing, the receiving FI 106 may provide to the acquiring FI 202 and/or to the funding FI 204—via the payment system 102—the name and residential address of the recipient so that the acquiring FI 202 and/or the funding FI 204 may perform anti-money laundering screening with respect to the recipient before the remittance transaction is consummated. The receiving FI 106 may have retrieved the recipient's name and residential address from the KYC database 112 maintained by the receiving FI 106.)

At 1118, the receiving FI 106 may confirm to the payment system 102 the validity of the recipient's payment card account number used to route the funds transfer to the receiving FI 106, and may also confirm to the payment system 102 that the recipient's payment card account is in good standing and available to receive the funds transfer.

At 1120, the payment system 102 may send a message to the acquiring FI 202 to confirm that the funds transfer has taken place. In the same message or in a related message, the payment system 102 may send the recipient's name and residential address to the acquiring FI 202.

At 1122, the acquiring FI 202 may notify the sender by any suitable mechanism that the funds transfer has taken place.

At 1124, clearing and settlement of the remittance transaction are performed. For example, the acquiring, funding and receiving FIs may sending clearing files to the payment system 102 based on the payment card account numbers of the sender and of the recipient of the funds transfer. The payment system 102 may handle settlement of the transactions, including, e.g., instructing its clearing bank (not shown) to transfer funds among accounts belonging to the acquiring FI 202, the funding FI 204 and the receiving FI 106.

At 1126, the receiving FI 106 may notify the recipient that the funds transfer has taken place and that the funds are available to the recipient. The receiving FI 106 may provide the notification to the recipient via the notification mechanism 116 indicated in FIG. 1. The notification mechanism 116 may be any suitable mechanism, including the recipient's electronic mail account or the recipient's mobile telephone. It should also be understood that the receiving FI 106 may provide the funds availability notification to the recipient at an earlier stage of the process of FIGS. 11A-11B, such as at the same time as step 118.

In one variation of the process of FIGS. 11A-11B, the sender may be present at an ATM, kiosk, bank branch, retail store or RSP location to initiate the remittance transaction. In some cases, the sender may interact with a remittance agent face-to-face or via a telephone conversation. In other cases, the sender may operate a personal computer (in communication with a remittance services server computer) or a mobile telephone or other electronic device to initiate the remittance transaction. Moreover, the transaction may be performed such that the validity of the recipient's payment card account may be verified in real-time, i.e., before completion of the sender's session with the ATM or kiosk or before the sender leaves the counter at the bank branch retail store or RSP location, or before completion of an interaction with a remittance services server computer. In some embodiments, sending of one or more messages to request the remittance transaction (the request including the recipient's account number, mobile telephone number and/or other information that identifies the recipient or his/her account), funding authorization, routing to the receiving FI 106 and the receiving FI's confirmation of the validity of the recipient payment card account all occur within a short time to allow the sender to be informed immediately whether or not the funds transfer was successful. In other embodiments, the validity of the recipient's payment card account is confirmed prior to the routing of the routing of the funds transfer, so that, once authorization of the funding has been received, the sender can be assured that the funds transfer will be successful. In either case, the real-time confirmation of the recipient's payment card account prevents the sort of inconvenient occurrence possible with other systems in which the sender leaves the ATM, kiosk, bank branch, etc. believing that the fund transfer has occurred, only to learn later that in subsequent batch processing the transaction was canceled because the recipient's payment card account was found to be non-existent or invalid. Thus in cases where the recipient's account number is invalid or cannot be determined, a message to this effect is provided in response to the request for the remittance transaction. This response message may be routed back through the system to the device which originally sent the message to request the remittance transaction. In this way, the sender can be protected to some extent from inconvenience or disappointment arising from the sender's error in specifying the destination of the funds transfer or arising from similar errors, or from the recipient having closed his/her payment card account without informing the sender.

In a variation on the process of FIGS. 11A-11B, when the funding FI 204 authorizes funding the remittance transaction, the authorization may be transmitted from the payment system 102 to the acquiring FI 202. The acquiring FI 202 may then initiate the remittance transaction to be routed to the receiving FI 106 via the payment system 102.

In another variation on the process of FIGS. 11A-11B, the sender may choose to fund the remittance transaction with a deposit or payment of cash to an RSP or to an FI.

Generally with respect to the transactions described with respect to FIGS. 10A-10D and 11A-11B, the payment system may store KYC/AML information for each transaction and/or any one or more of a sending FI, an acquiring FI, a funding FI and/or a receiving FI may store KYC/AML information for each transaction. It should be understood that KYC/AML information for a transaction may include the sender's name and residential address and/or the recipient's name and residential address and possibly one or more unique transaction numbers.

The payment systems described herein may, for example, be of the "dual message" type or the "single message" type. As is understood by those who are skilled in the art, in the dual message type of system, the request for authorization of a transaction and resulting favorable response by the account issuer are followed by a second message (e.g., in a batch mode of operation) in which the transaction is submitted for clearing. By contrast, in a single message system, the transaction is immediately submitted for clearing based on the same message that requested authorization, assuming that the authorization was granted.

In the remittance systems schematically illustrated in FIGS. 1-3, only one sending FI, acquiring FI, funding FI and/or receiving FI (as the case may be) is shown. In practice, however, in each system the relationships permitted by the system may be many-to-many, in the sense that each system may (but need not) include dozens, hundreds or even thousands of financial institutions as system participants in any one or more of the FI roles described above.

Given that the funds transfers described herein may utilize the payment card accounts of the sender and/or the recipient, the funds transfer transactions may appear as entries on the periodic (e.g., monthly) statements received by the sender and/or the recipient. For example, the entry for a remittance transaction on the sender's monthly payment card account statement may indicate the amount of the funds transfer (possibly inclusive of fees) together with the recipient's name. The entry for a remittance transaction on the recipient's monthly payment card statement may indicate the amount credited to the recipient's account as a result of the funds transfer, and may also include the sender's name. The recipient's name or sender's name in the remittance transaction entry may appear, in some embodiments, in the field used to identify the merchant in the case of a purchase transaction entry on the statement.

Various examples of international remittance transactions have been described above, but in most if not all cases the remittance systems that perform the international remittance transactions may also be capable of performing domestic remittance transactions that are the same as or substantially similar to the international remittance transactions.

In some example transactions described above, either or both of the sender and the recipient of a remittance transaction are identified by their mobile telephone number. However, other items of information may alternatively be used to identify the sender and/or the recipient. Use of the sender's or recipient's payment card account number for identifying them has been previously described, and as another alternative, the SIM (subscriber identity module) number for the sender's or recipient's mobile telephone may be used to identify the sender or the recipient. Other MNO-related information, such as the sender's or recipient's mobile wallet account number may alternatively be used to identify the sender or the recipient. In still another embodiment, a mobile ISDN (integrated services digital network) identifier for the mobile telephone may be used to identify the sender or the recipient.

Although the remittance transaction patterns of FIGS. 1-3 are illustrated separately, in one or more practical embodiments, a single remittance system may be capable of implementing any two or more of the remittance transaction patterns shown in FIGS. 1-3.

In some embodiments, transaction messages that pass through the payment system 102 in regard to remittance transactions may include a special code or codes to indicate that financial institutions that are parties to the remittance transactions have included, or will be required to include, in the transaction messages, KYC/AML information about the sender and recipient of the remittance transactions.

Figure 12:
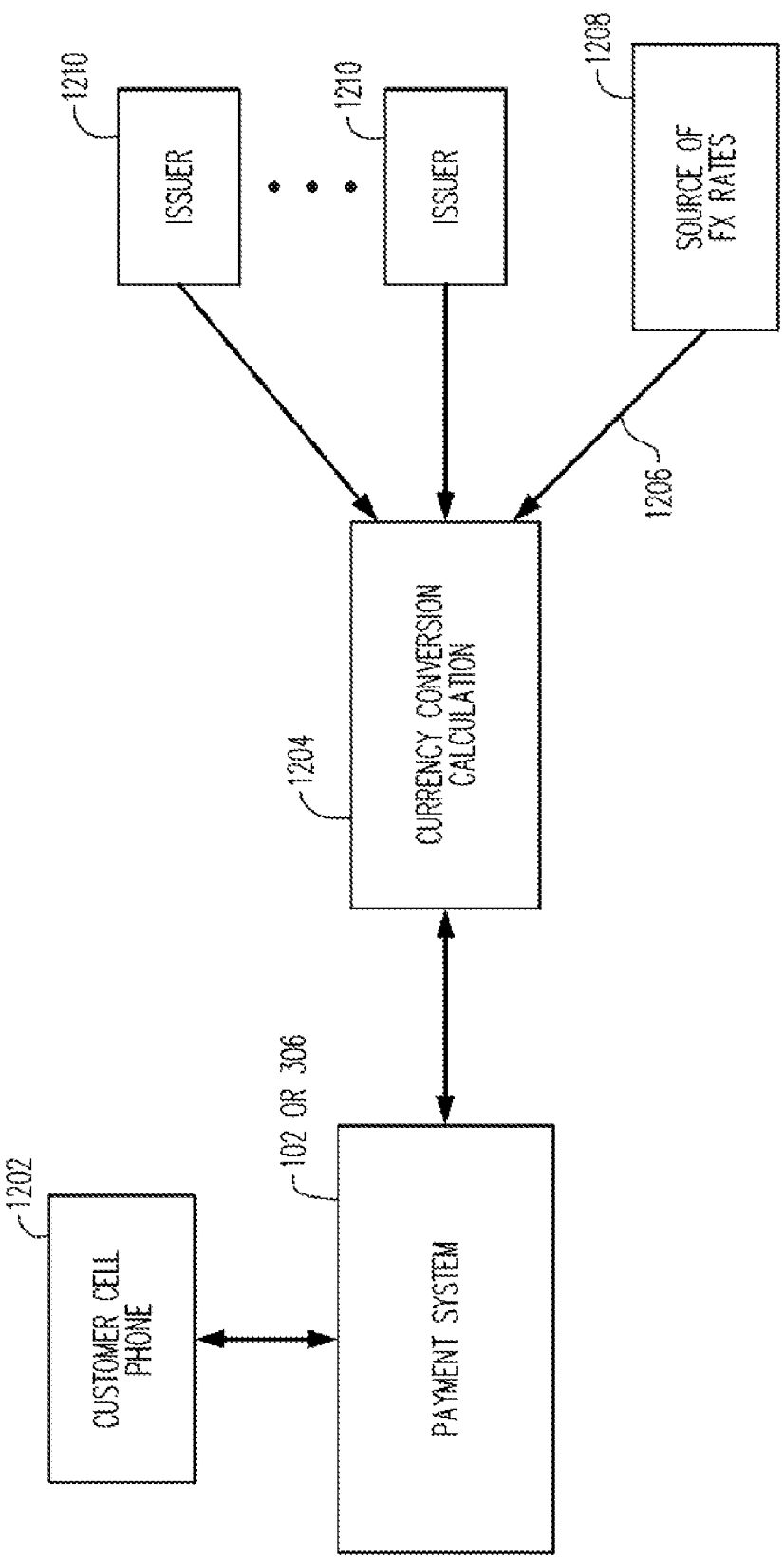
FIG. 12 is a block diagram that shows features that may be incorporated in one or more of the remittance systems of FIGS. 1-3.

FIG. 12 is a block diagram that shows features that may be incorporated in one or more of the remittance systems of FIGS. 1-3.

The features illustrated in FIG. 12 are concerned with providing to a customer an estimate of the effects of currency conversion on a proposed transaction. Such an estimate may be helpful in connection with an intended international remittance transaction in which the sender is to transfer a monetary amount in his/her local currency from his/her payment card account and wishes to know what monetary amount in a different currency (the "home currency") will likely be credited to the recipient.

A currency conversion estimate as provided in accordance with aspects of the invention may also be helpful in some cases to a customer who is engaging in a retail transaction while abroad. It is not uncommon for the retailer to offer to the purchaser an option of accepting a payment card charge of X monetary amount in the local currency or Y monetary amount in the purchaser's home currency. By obtaining an estimate of currency conversion effects as described below, the purchaser can be informed in advance of the likely result in the home currency of accepting the payment card charge of X monetary amount in the local currency. The purchaser can then effectively comparison shop between allowing the retailer to make the conversion to the home currency, or allowing the purchaser's payment card issuer to make the conversion to the home currency.

Referring, then, to FIG. 12, the customer's mobile telephone 1202 may be used by the customer to exchange data communications with the payment system 102 or 306 in which the customer's payment card (not shown) has been issued. (In practice, the mobile telephones—not shown—of many other customers may be simultaneously in data communication with the payment system 102 or 306.) The payment system 102 or 306 incorporates or is in communication with a currency conversion calculation server computer 1204.

The currency conversion calculation server computer 1204 is connected by a data communication channel 1206, at least from time to time (e.g., daily) to a source 1208 of information about currently applicable foreign exchange rates. Further, at various times the currency conversion calculation server computer 1204 receives conversion fee information from computers 1210 operated by or on behalf of issuers of payment cards usable in the payment system 102 or 306. For example, the issuer computers 1210 may provide updated currency conversion fee information to the currency conversion calculation server computer 1204 on occasions when the issuers of the payment cards change their fees for performing currency conversions.

Figure 13:
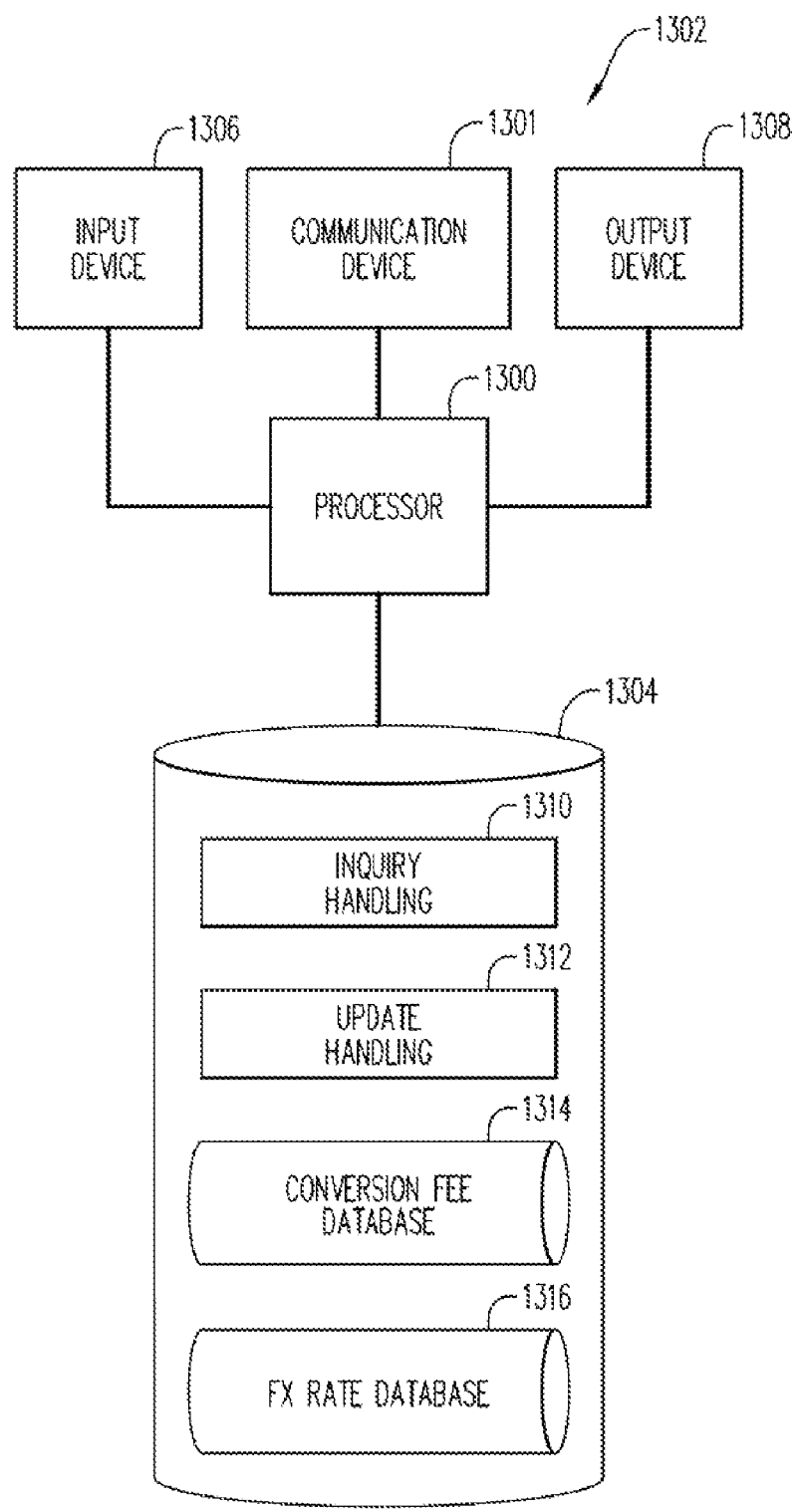
FIG. 13 is a block diagram representation of a computer system that may be among the system features shown in FIG. 12.

FIG. 13 is a block diagram representation of the currency conversion calculation server computer 1204 shown in FIG. 12

In its hardware aspects, the currency conversion calculation server computer 1204 may be conventional, and similar to the hardware components described above in connection with the computer system 502 and computer system 702. The hardware aspects of the currency conversion calculation server computer 1204 will therefore not be further described, except to mention that the currency conversion calculation server computer 1204 may include a processor 1300 in communication with a communication device 1301, a storage device 1304, an input device 1306, and an output device 1308.

The storage device 1304 may store an application program 1310 to control the currency conversion calculation server computer 1204 to handle inquiries concerning the effects of currency conversion on proposed transactions.

The storage device 1304 may also store an application program 1312 that allows the currency conversion calculation server computer 1204 to process and store foreign exchange rate data provided by the information source 1208 and data concerning conversion fee updates provided by the issuer computers 1210.

In addition, the storage device 1304 may store a database 1314 of currency conversion fees charged by payment card issuers that participate in the payment system 102 or 306, and a database 1316 of currently applicable foreign exchange market conversion rates.

Figure 14:
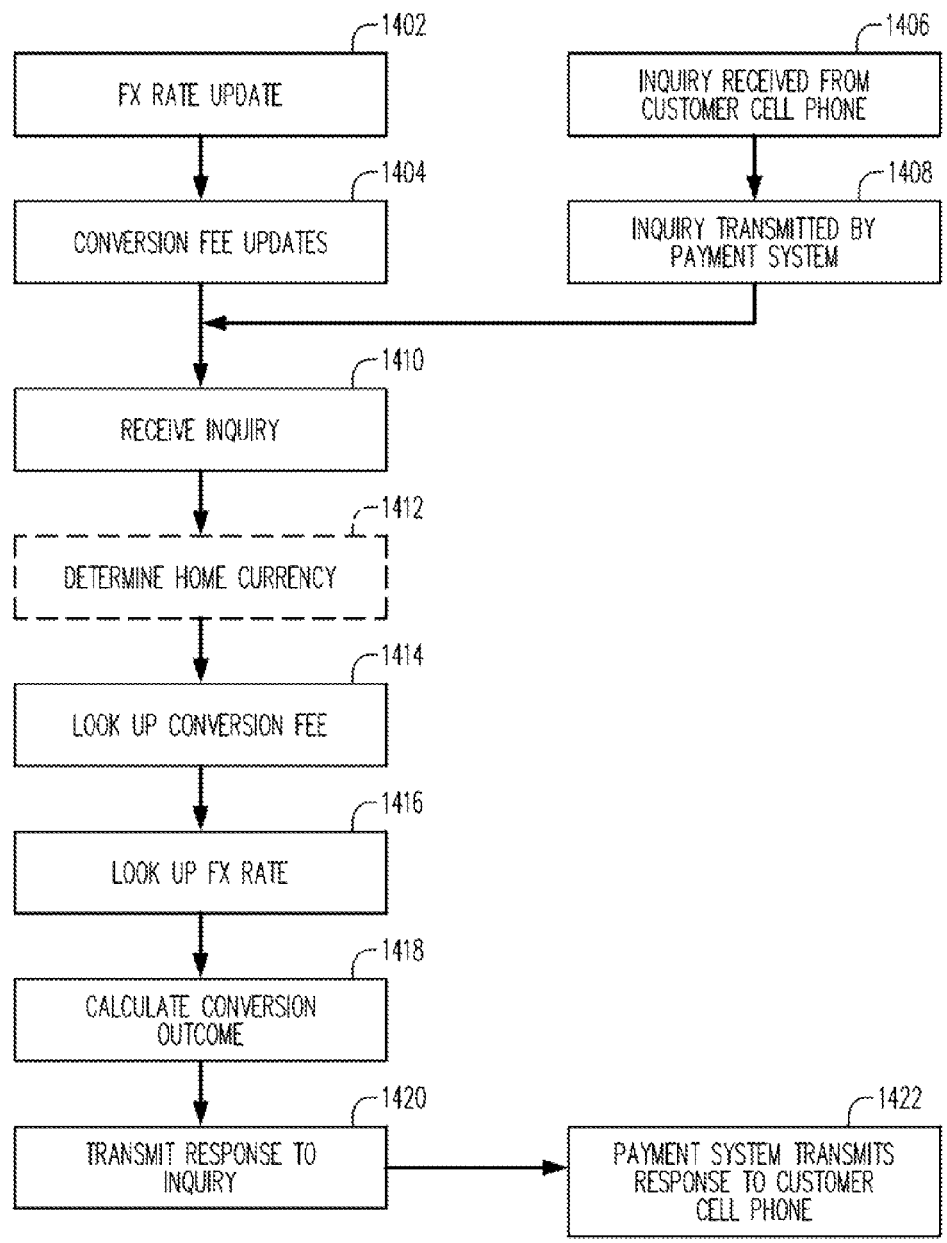
FIG. 14 is a flow chart that illustrates a process that may be performed using the system components shown in FIG. 12.

FIG. 14 is a flow chart that illustrates a process that may be performed using the system components shown in FIG. 12, according to some aspects of the invention. Moreover, a portion of the process of FIG. 14 is indicative of operations performed by the currency conversion calculation server computer 1204 in accordance with aspects of the invention and in accordance with program instructions stored on storage device 1304 to control the processor 1300.

Block 1402 in FIG. 14 represents periodic (e.g., daily, or more frequent) updates received and processed by the currency conversion calculation server computer 1204 concerning currently applicable foreign exchange conversion rates. Upon receiving each FX conversion rate update, the currency conversion calculation server computer 1204 stores the updated FX conversion rate data in the FX rate database 1316.

Block 1404 in FIG. 14 represents updates that the currency conversion calculation server computer 1204 may receive from the issuer computers 1210 from time to time concerning currency conversion fees that the payment card issuers charge. The currency conversion fees charged by the issuers may vary from issuer to issuer, and may be changed from time to time by each issuer, thereby occasioning the updates indicated by block 1404. For example, one issuer may charge a currency conversion fee of 1% of the amount converted; another issuer may charge a currency conversion fee of 1.5% of the amount converted; a third issuer may charge a currency conversion fee of 2% of the amount converted.

At 1406 in FIG. 6, the payment system 102 or 306 receives an inquiry about currency conversion from the customer's mobile telephone 1202. The inquiry may identify the local currency from which conversion is to be made, and may specify the amount of the local currency to be converted. The inquiry may also include the prefix (e.g., the first eight digits) of the payment card account number that corresponds to the customer's payment card account. As is understood by those who are skilled in the art, the prefix of the payment card account number may identify the issuer of the customer's payment card account.

At 1408, the payment system 102 or 306 transmits the inquiry to the currency conversion calculation server computer 1204. At 1410, the currency conversion calculation server computer 1204 receives the inquiry.

At 1412, the currency conversion calculation server computer 1204 may determine the home currency to which the issuer will convert the local currency about which the customer has made the inquiry. In other words, the currency conversion calculation server computer 1204 may determine the currency in which the customer's payment card account is denominated. This may be done by a database or table look-up using the payment card account prefix, which identifies the issuer of the customer's payment card account, and which therefore is indicative of the home currency in which the issuer operates.

However, in other cases or in alternative embodiments, the customer's inquiry may specify a "home currency" in which a funds transfer is to be made available to a recipient. In such a case, there is no need for the currency conversion calculation server computer 1204 to identify the "home currency", since the "home currency" is identified by the inquiry itself.

In still other cases or embodiments, the customer's inquiry may indicate the payment card account number prefix or telephone international country dialing code of the recipient, and the currency conversion calculation server computer 1204 may use this information at step 1412 to determine the "home currency" to which the customer's intended funds transfer is to be converted.

In any case, at 1414 the currency conversion calculation server computer 1204 may use the prefix of the customer's payment card account (or the prefix of the recipient's payment card account, as the case may be) to look up from the conversion fee database 1314 the conversion fee to be applied by the issuer of the customer's payment card account (or to be applied by the receiving FI, as the case may be).

At 1416, the currency conversion calculation server computer 1204 looks up from the FX rate database 1316 the currently applicable conversion rate from the local currency to the home currency.

Then, at 1418, the currency conversion calculation server computer 1204 performs a calculation that is intended to anticipate the conversion rate and fee calculation to be made by the payment card account issuer for the customer's intended transaction (i.e., either the issuer of the customer's payment card account, if the customer is inquiring about a planned purchase transaction, or the receiving FI/issuer if the customer is inquiring about a planned funds transfer). For example, the currency conversion calculation server computer 1204 may apply the FX conversion rate looked up at 1416 and the issuer conversion fee looked up at 1414 to the amount of the transaction as denominated in the local currency to arrive at an outcome of the conversion calculation. It may be expected that this outcome will be a rather accurate estimate, though not a guaranteed figure, with respect to the amount to be charged to the customer's payment card account in the home currency (in the case of a purchase transaction), or the amount to be made available to the recipient in the home currency (in the case of a funds transfer).

At 1420, the currency conversion calculation server computer 1204 transmits the outcome of the conversion calculation to the payment system 102 or 306. At 1422, the payment system 102 or 306 transmits the outcome of the conversion calculation, as received from the currency conversion calculation server computer 1204, to the customer's mobile telephone 1202 as a response to the customer's inquiry. The payment system 102 or 306 may transmit the conversion calculation outcome to the customer's mobile telephone as a text message in accordance with one of the SMS, USSD or SMTP protocols, for example. The customer now has information that may be useful in determining what currency to select for a purchase transaction, or in planning or following up on an international remittance transaction.

Figure 15:
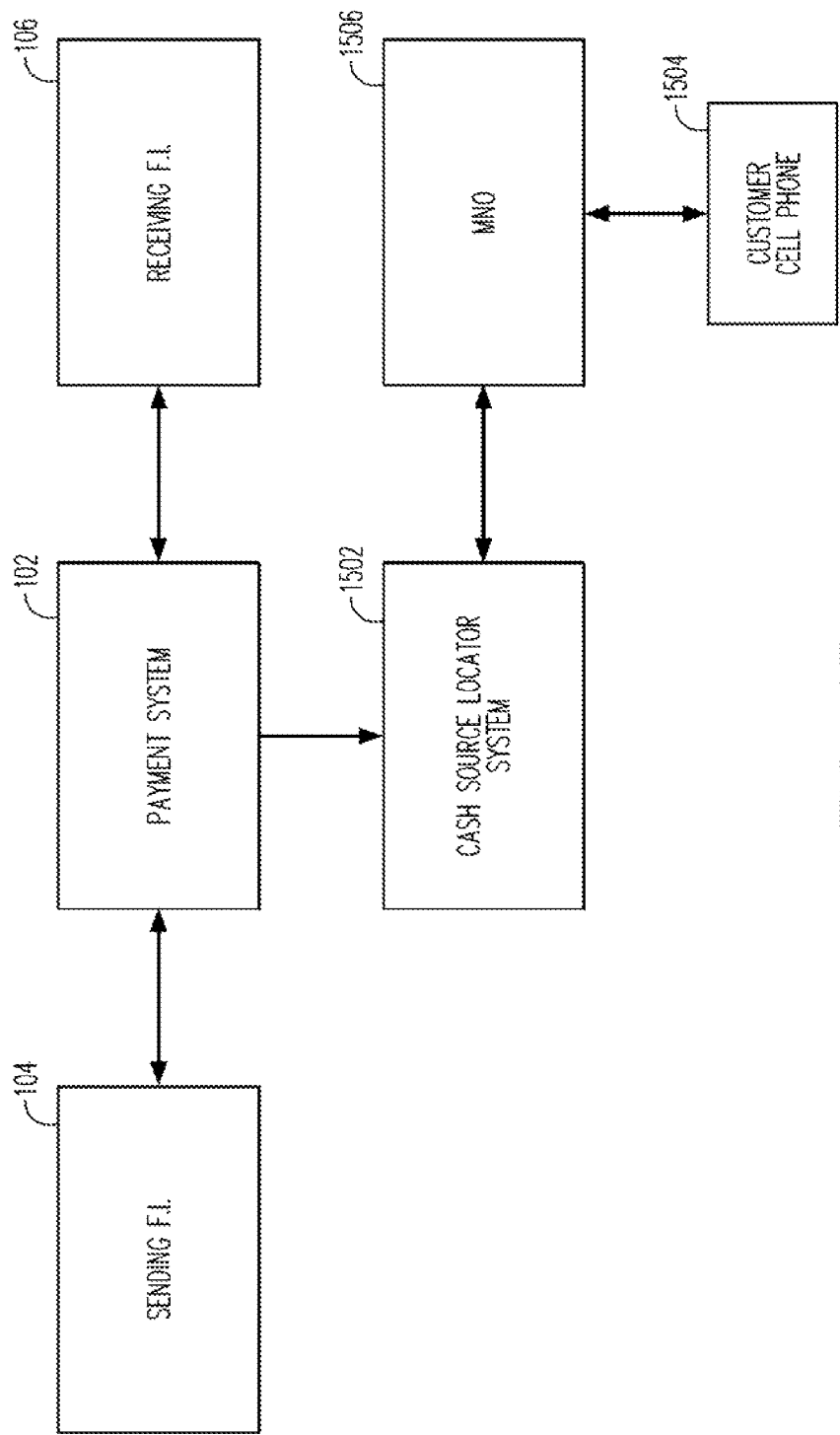
FIG. 15 is a block diagram that shows other features that may be incorporated in one or more of the remittance systems of FIGS. 1-3.

FIG. 15 is a block diagram that shows other features that may be incorporated in one or more of the remittance systems of FIGS. 1-3.

According to some aspects of the system as depicted in FIG. 15, the payment system 102 plays a role in notifying the recipient when a funds transfer has become effective and the funds are available, and in addition may aid the recipient in finding out about nearby locations at which the recipient may physically obtain cash in respect of the funds transfer.

Blocks representing the sending FI 104, payment system 102 and receiving FI 106 of FIG. 1 are shown again in FIG. 15 (but alternatively may represent the sending FI 304, payment system 306 and receiving FI 310 of FIG. 3). In addition, as an adjunct to the payment system 102 there is a cash source locator system 1502. As will be seen, the cash source locator system 1502 may operate to aid the recipient in finding a nearby location to obtain cash. The cash source locator system 1502 may communicate with the recipient's mobile telephone 1504 via the recipient's MNO 1506. It will be understood that the "recipient's MNO" is the MNO that provides mobile network services to the recipient's mobile telephone 1504.

(As another alternative, the cash source locator system 1502 may be an adjunct to a "three-cornered" remittance system as shown in FIG. 2)

Figure 16:
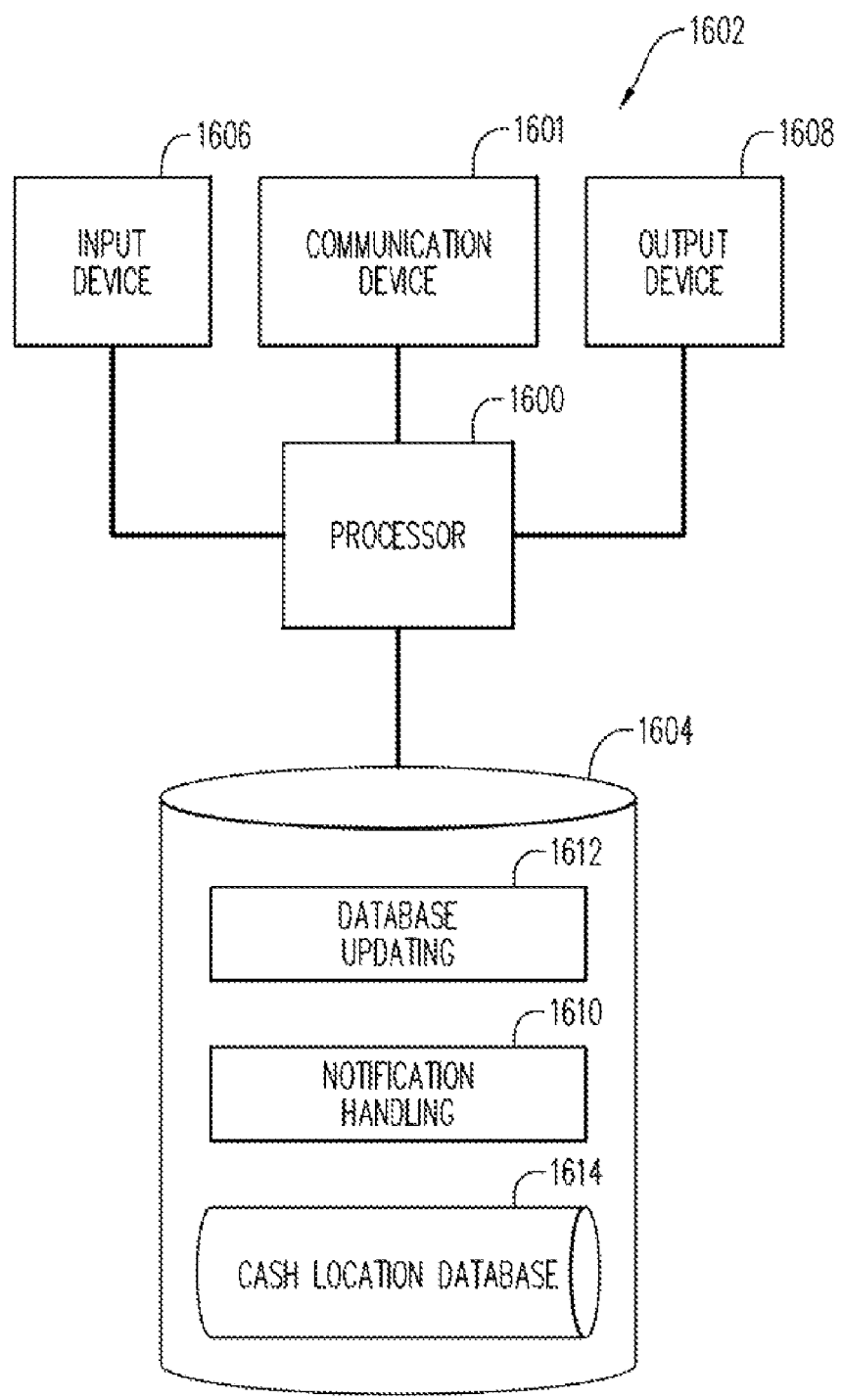
FIG. 16 is a block diagram representation of a computer system that may be among the system features shown in FIG. 15.

FIG. 16 is a block diagram representation of a computer system 1602 that may be provided to implement the cash source locator system 1502. As such, the computer system 1602 may be operated by or on behalf of the payment system, or by another organization that partners with the payment system to provide a service for finding cash locations.

In its hardware aspects, the computer system 1602 may be conventional, and similar to the hardware components described above in connection with the computer systems 502 and 702 and in connection with the currency conversion calculation server computer 1204. The hardware aspects of the computer system 1602 will therefore not be further described, except to mention that the computer system 1602 may include a processor 1600 in communication with a communication device 1601, a storage device 1604, an input device 1606, and an output device 1608. The storage device 1604 may store an application program to control the computer system 1602 to perform a process in which the computer system 1602 transmits, to recipient mobile telephones, notifications that funds transfers in their favor have become effective, and information about nearby locations to pick up cash.

The storage device 1604 may also store an application program 1612 that allows the computer system 1602 to process and store data that updates a database 1614 of cash locations. The database 1614 may also be stored on the storage device 1604.

Figure 17:
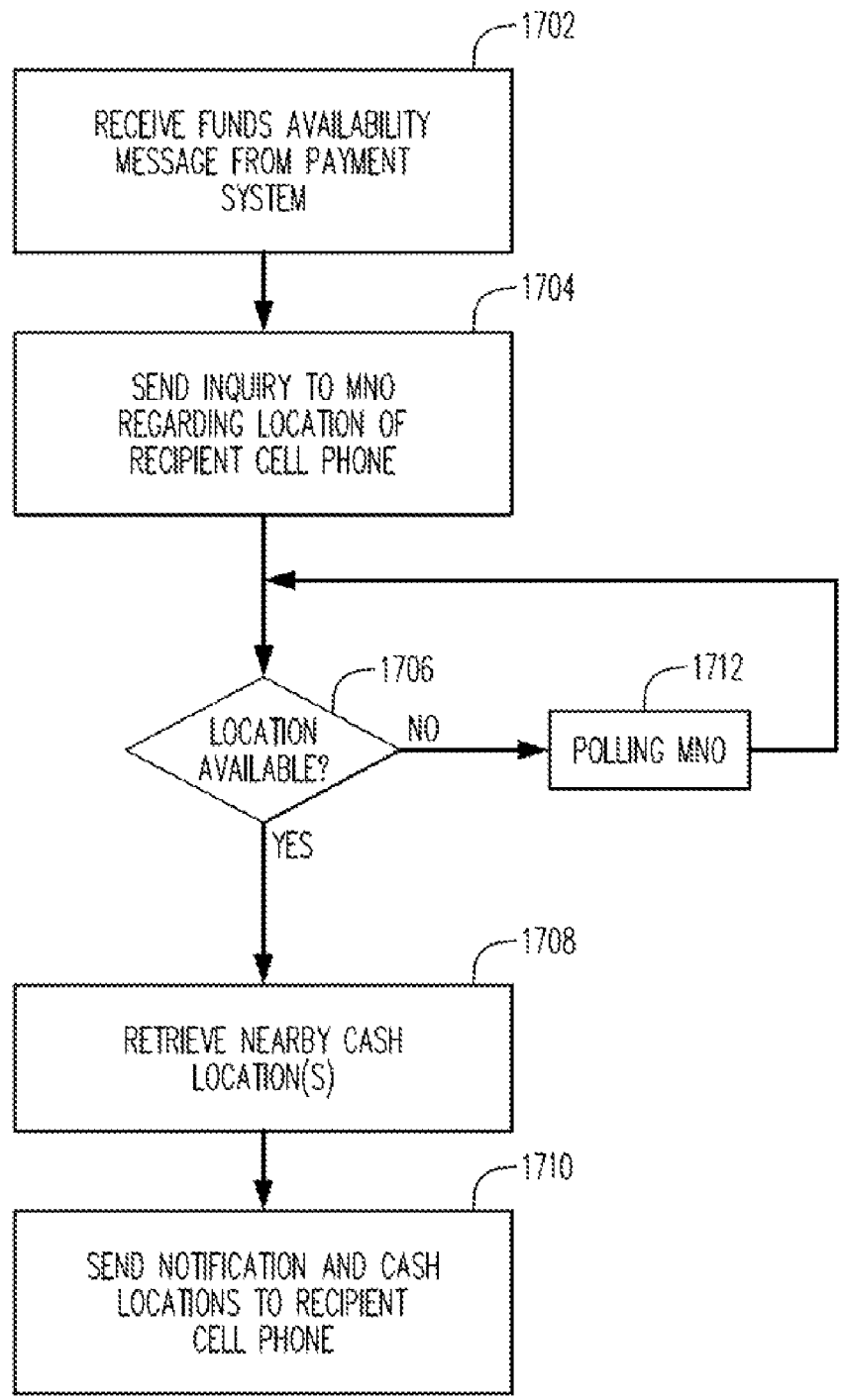
FIG. 17 is a flow chart that illustrates a process that may be performed using the system components shown in FIG. 15.

FIG. 17 is a flow chart that illustrates a process that may be performed by the computer system 1602, according to some aspects of the invention and in accordance with program instructions stored on the storage device 1604 to control the processor 1600.

At 1702 in FIG. 17, the computer system 1602 receives from the payment system 102 a message to indicate that a funds transfer has become effective and the resulting funds are accordingly available for the designated recipient. The message may identify the recipient by the mobile telephone number of the recipient's mobile telephone 1504. The message may also indicate the amount of funds available. In some embodiments, the message may also identify the sender of the funds transfer. The name of the recipient may also be included in the message.

At 1704, the computer system 1602 sends an inquiry to the MNO 1506. The inquiry may be for the purpose of requesting from the MNO information concerning the current location of the recipient's mobile telephone. As is well known, so long as a mobile telephone is turned on, and is within the service coverage area of its MNO, the MNO keeps track as to which mobile service cell of the network the mobile telephone is currently located in. Thus, the MNO is able to determine with some degree of accuracy and reliability the current location of the recipient's mobile telephone In various embodiments, the MNO may respond to the inquiry from the computer system 1602 by providing to the computer system 1602 information concerning the current location of the recipient's mobile telephone in various forms, such as simply by reporting the location of mobile service cell in which the recipient's mobile telephone is currently located, and/or latitude and longitude coordinates, vertical and horizontal coordinates, global positioning system coordinates, postal code (e.g., U.S. Postal Service zip code). In the event that the MNO cannot determine the current location of the recipient's mobile telephone (e.g., because the mobile telephone is turned off or out of the service area), the MNO may respond to the inquiry from the computer system 1602 by informing the computer system 1602 that the current location of the recipient's mobile telephone is unavailable (i.e., the current location of the recipient's mobile telephone is unknown to the MNO).

Following step 1704 performed by the computer system 1602 is a decision block 1706. At 1706, the computer system 1602 determines whether the MNO provided to the computer system 1602 the current location of the recipient's mobile telephone. If so, then step 1708 follows. At 1708 the computer system 1602 uses the current location of the recipient's mobile telephone, as reported by the MNO, as input data for a conventional mapping procedure to determine one or more nearby locations at which the recipient is able to obtain cash from the account credited by the funds transfer. If necessary, before starting the mapping procedure, the computer system 1602 may translate the location information provided by the MNO into a format that is compatible with the mapping procedure. The mapping procedure may operate in conjunction with a database of cash locations. The database may include the mapping coordinates or other location information for the cash locations.

At 1710, the computer system 1602 sends a message to the recipient's mobile telephone 1504 via the MNO 1506. The message may for example be a text message and may be in a conventional format, e.g., such as SMS, USSD or SMTP. The message may contain information to inform the recipient that the funds transfer for his or her benefit has taken place. The message may also contain information to inform the recipient of one or more nearby locations (e.g., bank branches, ATMs and/or retail outlets) at which the recipient may obtain cash from the account credited with the funds transfer.

By including the cash location information together with the notification that the funds transfer has occurred, the payment system may provide additional convenience to the recipient in terms of obtaining access to the funds transferred for the benefit of the recipient. One result of the process of FIG. 17 is that the timing at which the recipient is informed of the cash locations is determined largely or completely by the timing at which the computer system 1602 receives an indication from the payment system 102 that the funds transfer has taken place.

Considering again decision block 1706 in FIG. 17, if the computer system 1602 makes a negative determination at that point (i.e., if the computer system determines that the MNO has not provided the current location of the recipient's mobile telephone), then step 1712 may follow the decision block 1706. At step 1712, the computer system may poll the MNO by repeating the inquiry of step 1704 at regular intervals until the MNO provides the current location of the recipient's mobile telephone. In some embodiments, the polling may "time out" or expire after a certain period of time or a certain number of inquiries to the MNO. In some embodiments, the time intervals between inquiries may be progressively lengthened after the first few inquiries or after a certain number of inquiries.

As the logic of FIG. 17 indicates, once the computer system 1602 has received from the MNO an indication of location of the recipient's mobile telephone, the computer system may then send the funds availability notification and the cash location information to the recipient's mobile telephone.

In cases where the polling of the MNO is unsuccessful, or not successful within a certain period of time, then the computer system may merely transmit to the recipient's mobile telephone a notification of the availability of the funds, without including cash location information. In such cases, the notification may be retrieved by the recipient when he/she turns on his/her mobile telephone or when he/she returns to the MNO service coverage area. The notification may also include an option for the recipient to respond to the computer system 1602 by requesting cash location information. If the recipient does so respond, the computer system 1602 may then send another inquiry to the MNO requesting the location of the recipient's mobile telephone. With that information now presumably available, the computer system 1602 may use the mobile telephone location information to determine one or more nearby cash locations, and then may transmit the cash location information to the recipient's mobile telephone.

In another embodiment, the process of FIG. 17 may be modified such that the computer system 1602 sends a funds availability notification to the recipient's mobile telephone in the first instance without previously requesting the mobile telephone location information from the MNO. The notification may include (as in the previous paragraph) an option for the recipient to respond by requesting that the computer system 1602 provide cash location information. As in the previous paragraph, the computer system may proceed, if such a request is received from the recipient, to send an inquiry to the MNO requesting the location of the recipient's mobile telephone. Upon receiving this information from the MNO, the computer system may then determine one or more nearby cash locations and then send a second message to the recipient's mobile telephone to inform the recipient of the cash location(s) that are near the recipient's location.

The database of cash locations employed by the computer system 1602 may include information about the cash locations in addition to the physical locations of the cash locations. For example, the database may include one or more of the following items of information about some or all of the cash locations: (a) Hours of operation, (b) type of location (e.g., bank branch, ATM, RSP location or affiliated retail outlet), (c) the limit, if any, on the amount of cash that the location will make available per transaction/per day, etc. (d) amount of fee charged by the cash location, (e) currency conversion rate applied by the cash location, (f) types of currency (e.g., U.S. dollars, Euros, British pounds) available at the location. When the computer system accesses the database to find nearby cash locations for the recipient, it may also determine one or more of the above-enumerated items of information with respect to the nearby cash locations. In some embodiments, the computer system 1602 may sort the nearby cash locations according to one or more of these attributes. For example, the computer system 1602 may take the hours of operation of nearby cash locations into consideration, and may omit cash locations that are currently closed from the cash location information provided to the recipient. In some embodiments, the information about the cash locations, as transmitted to the recipient's mobile telephone by the computer system 1602, may include information about both nearby cash locations that are currently open and about nearby cash locations that are currently closed, with an indication as to each closed location that it is currently closed and when it is scheduled to open. In some embodiments, the information about the cash locations may additionally or alternatively inform the recipient of the fees charged by each cash location and/or of the currency conversion rate applied by each location and/or of any limits on the amount of cash that the recipient may obtain at the location.

According to other embodiments, the computer system 1602 may provide information to the recipient to indicate that a remittance initiated by the sender has failed for some reason. Another type of notification that may be provided to the recipient by the computer system 1602 may indicate that the funds will be available at a certain time in the future (say, on the next business day). In both of these cases, the computer system may, but need not, refrain from informing the recipient about nearby cash locations.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account or a deposit account that the account holder may access using a debit card. The term "payment card account number" includes a number that identifies a payment card account or a number carried by a payment card, or a number that is used to route a transaction in a payment system that handles debit card and/or credit card transactions. The term "payment card" includes a credit card or a debit card.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
receiving in a computer, from a first financial institution, a request for a funds transfer, the request originating from a sender who has an account with the first financial institution, the request indicating that the funds transfer is to be made from said account;
routing the funds transfer from the computer to a second financial institution for crediting to a payment card account of a recipient; and
receiving in the computer, from the second financial institution, the recipient's name and residential address.

2. The method of claim 1, wherein the request for the funds transfer identifies the recipient by the recipient's telephone number.

3. The method of claim 2, wherein the telephone number is a mobile telephone number.

4. The method of claim 1, wherein the request for the funds transfer identifies the recipient by an account number that identifies an account maintained by the second financial institution in the recipient's name.

5. The method of claim 4, wherein the account is a payment card account.

6. The method of claim 1, further comprising:
receiving the sender's name and residential address from the first financial institution.

7. The method of claim 6, further comprising:
transmitting the sender's name and residential address to the second financial institution.

8. The method of claim 7, further comprising:
transmitting the recipient's name and residential address to the first financial institution.

9. The method of claim 1, further comprising:
transmitting the recipient's name and residential address to the first financial institution.

10. A method of performing a funds transfer transaction, the method comprising:
receiving in a computer a request for a funds transfer from a first mobile telephone; the first mobile telephone having a first telephone number; the first telephone number associated with a first account holder; the first account holder having an account at a first financial institution; the first financial institution storing first identification data in regard to the first account holder; the first identification data including the name of the first account holder, the residential address of the first account holder, and a record of an identification document that confirms the name and residential address of the first account holder; the request for funds transfer including routing information indicative of a destination for the funds transfer; the destination associated with a second account holder; the second account holder having a payment card account at a second financial institution; the second financial institution storing second identification data including the name of the second account holder, the residential address of the second account holder, and a record of an identification document that confirms the name and address of the second account holder, the request indicating that the funds transfer is to be made from said account at the first financial institution;

routing the funds transfer from the computer to the destination for crediting to the payment card account of the second account holder; and receiving in the computer, from the second financial institution, information that includes the name and residential address of the second account holder.

11. The method of claim 10, wherein the routing information includes a telephone number of the second account holder.

12. The method of claim 11, wherein the telephone number is a mobile telephone number.

13. The method of claim 12, wherein the destination is a payment card account of the second account holder.

14. The method of claim 13, wherein the funds transfer is a payment transaction in a payment card system.

15. The method of claim 14, further comprising:

associating a unique transaction number with the funds transfer; and storing the unique transaction number in association with (a) a payment card account number of the first account holder, and (b) the name and residential address of the second account holder.

16. The method of claim 14, further comprising:

associating a unique transaction number with the funds transfer; and storing the unique transaction number in association with (a) a payment card account number of the first account holder, and (b) the name and residential address of the first account holder.

17. A method comprising:

receiving in a computer, from a first financial institution, a request for a funds transfer, the funds transfer originating from a sender;

transmitting an inquiry from the computer to a second financial institution, the sender having an account with the second financial institution;

receiving in the computer the sender's name and residential address from the second financial institution in response to the inquiry;

receiving in the computer, from a third financial institution, the name and residential address of a recipient; and routing the funds transfer from the computer to the third financial institution for crediting to a payment card account of the recipient.

18. The method of claim 17, wherein the request for the funds transfer identifies the sender only by the sender's telephone number.

19. The method of claim 18, wherein the telephone number is a mobile telephone number.

20. The method of claim 17, wherein the request for the funds transfer identifies the sender only by an account number that identifies the sender's account with the second financial institution.

21. The method of claim 17, wherein the inquiry identifies the sender only by an account number that identifies the sender's account with the second financial institution.

22. The method of claim 17, further comprising:

transmitting the sender's name and residential address to the third financial institution.

23. The method of claim 22, further comprising:

transmitting the recipient's name and residential address to the second financial institution.

24. The method of claim 17, further comprising:

transmitting the recipient's name and residential address to the second financial institution.

25. The method of claim 17, further comprising:

transmitting the sender's name and residential address to the first financial institution.

26. The method of claim 25, further comprising:

transmitting the recipient's name and residential address to the first financial institution.

27. The method of claim 17, further comprising:

transmitting the recipient's name and residential address to the first financial institution.

28. The method of claim 17, wherein the inquiry includes a request that the second financial institution authorize a transaction to fund the funds transfer from the sender's account with the second financial institution.

29. An apparatus comprising:

a processor; and a memory in communication with the processor, the memory storing program instructions, the processor operative with the program instructions to:

receive, from a first financial institution, a request for a funds transfer, the request originating from a sender who has an account with the first financial institution, the request indicating that the funds transfer is to be made from said account;

route the funds transfer to a second financial institution for crediting to a payment card account of a recipient; and receive, from the second financial institution, the recipient's name and residential address.

30. The apparatus of claim 29, wherein the processor is further operative to:

receive the sender's name and residential address from the first financial institution.

31. The apparatus of claim 30, wherein the processor is further operative to:

transmit the sender's name and residential address to the second financial institution.

32. The apparatus of claim 29, wherein the processor is further operative to:

transmit the recipient's name and residential address to the first financial institution.

* * * * *